(12) United States Patent
Miyairi et al.

(10) Patent No.: US 9,069,202 B2
(45) Date of Patent: Jun. 30, 2015

(54) LIQUID CRYSTAL DISPLAY DEVICE

(75) Inventors: Hidekazu Miyairi, Kanagawa (JP);
Tetsuji Ishitani, Kanagawa (JP);
Daisuke Kubota, Kanagawa (JP);
Toshiyuki Isa, Kanagawa (JP); Kouhei Toyotaka, Kanagawa (JP); Susumu Kawashima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 338 days.

(21) Appl. No.: 13/407,891

(22) Filed: Feb. 29, 2012

(65) Prior Publication Data

US 2012/0229747 A1 Sep. 13, 2012

(30) Foreign Application Priority Data

Mar. 11, 2011 (JP) ................. 2011-054032

(51) Int. Cl.
*G02F 1/1343* (2006.01)
*G02F 1/1333* (2006.01)
*G02F 1/1362* (2006.01)
*G02F 1/136* (2006.01)

(52) U.S. Cl.
CPC .... *G02F 1/133345* (2013.01); *G02F 1/134363* (2013.01); *G02F 1/136209* (2013.01); *G02F 1/136213* (2013.01); *G02F 1/136286* (2013.01); *G02F 2001/13606* (2013.01); *G02F 2001/13629* (2013.01); *G02F 2001/136295* (2013.01); *G02F 2201/124* (2013.01)

(58) Field of Classification Search
USPC ........................................... 349/43, 139, 148
See application file for complete search history.

(56) References Cited

U.S. PATENT DOCUMENTS

| | | | |
|---|---|---|---|
| 4,409,134 | A | 10/1983 | Yamazaki |
| 6,646,692 | B2 | 11/2003 | Yamazaki et al. |
| 6,825,488 | B2 | 11/2004 | Yamazaki et al. |
| 6,987,552 | B2 | 1/2006 | Yamazaki et al. |
| 7,567,328 | B2 | 7/2009 | Yamazaki et al. |
| 7,576,829 | B2 | 8/2009 | Kikuchi et al. |
| 7,799,590 | B2 | 9/2010 | Yamazaki et al. |
| 7,843,541 | B2 | 11/2010 | Haruyama |
| 7,995,179 | B2 | 8/2011 | Haruyama |

(Continued)

FOREIGN PATENT DOCUMENTS

| | | |
|---|---|---|
| JP | 2001-281703 | 10/2001 |
| JP | 2001-281704 | 10/2001 |

(Continued)

*Primary Examiner* — Richard Kim
*Assistant Examiner* — Ryan Crockett
(74) *Attorney, Agent, or Firm* — Nixon Peabody LLP; Jeffrey L. Costellia

(57) ABSTRACT

Provided are a liquid crystal display device with horizontal electric field mode, in which a decrease in driving speed can be suppressed by reducing the resistance of a wiring even when the number of pixels is increased, and a manufacturing method thereof. One of a scan wiring and a signal wiring is divided in an intersection portion where the scan wiring and the signal wiring intersect with each other, and the separated wirings are connected with a connection electrode positioned over a thick insulating film. Accordingly, parasitic capacitance at the intersection portion can be reduced, preventing the decrease in the driving speed. The connection electrode is formed at the same time as formation of a pixel electrode and a common electrode using a low-resistance metal, which contributes to the reduction in manufacturing process of the liquid crystal display device.

19 Claims, 15 Drawing Sheets

(56) References Cited

U.S. PATENT DOCUMENTS

| 8,017,456 | B2 | 9/2011 | Yamazaki et al. | |
|---|---|---|---|---|
| 2002/0024622 | A1* | 2/2002 | Murade | 349/44 |
| 2002/0110941 | A1* | 8/2002 | Yamazaki et al. | 438/25 |
| 2009/0109381 | A1* | 4/2009 | Haruyama | 349/98 |
| 2009/0218571 | A1* | 9/2009 | Chen et al. | 257/59 |
| 2010/0053530 | A1* | 3/2010 | Peng et al. | 349/139 |
| 2011/0317108 | A1 | 12/2011 | Yamazaki et al. | |

FOREIGN PATENT DOCUMENTS

| JP | 2008-112021 | 5/2008 |
|---|---|---|
| JP | 2008-241789 | 10/2008 |
| JP | 2009-104061 | 5/2009 |
| JP | 2011-017821 | 1/2011 |
| WO | WO 2005-090520 A1 | 9/2005 |

\* cited by examiner

LIQUID CRYSTAL DISPLAY DEVICE

BACKGROUND OF THE INVENTION

1. Field of the Invention

The present invention relates to a liquid crystal display device and a manufacturing method thereof.

2. Description of the Related Art

As a display device which is thin and lightweight (a so-called flat panel display), a liquid crystal display device including a liquid crystal element, a light-emitting device including a self-light-emitting element, a field emission display (an FED), and the like have been competitively developed.

As a display method of a liquid crystal display device, a twisted nematic (TN) mode is typically employed. However, a TN-mode liquid crystal display device, in which an electric field is applied in a direction perpendicular to a liquid crystal layer, has a disadvantage of a large change in color or luminance which depends on viewing angle, that is, narrowness of the viewing angle in which normal display can be recognized.

By contrast, a horizontal electric field mode such as an in-plane-switching (IPS) mode can be given as a display method of a liquid crystal display device which is often used besides the TN mode. In the horizontal electric field mode, liquid crystal molecules are driven by applying an electric field in a direction parallel to a substrate, unlike in the TN mode. Accordingly, a horizontal electric field mode liquid crystal display device can have a wider viewing angle than a TN-mode liquid crystal display device. However, a horizontal electric field mode still has problems in contrast ratio, response time, and the like.

A ferroelectric liquid crystal (FLC) mode, an optical compensated birefringence (OCB) mode, and a mode using a liquid crystal exhibiting a blue phase can be given as display modes with shortened response time of liquid crystal molecules.

In particular, a display mode using a liquid crystal exhibiting a blue phase enables high-speed response because the liquid crystal exhibiting a blue phase has a short response time of 1 msec or less, and in addition has a variety of advantages such as nonnecessity of an alignment film and a wide viewing angle (for example, see Patent Document 1).

In recent years, liquid crystal display devices having larger size and higher definition have been developed. When high-speed response is achieved, moving image display performance is improved and high-quality moving image can be provided. However, for larger size and higher definition of liquid crystal display devices, a decrease in driving speed of the liquid crystal display devices needs to be suppressed by reducing parasitic capacitance and resistance of wirings to display a high-quality moving image.

As the size and the definition of liquid crystal display devices increase, the number of pixels is increased, and the number of portions where scan lines and signal lines intersect with each other is increased accordingly. Thus, total parasitic capacitance between the scan lines and the signal lines is increased, and a problem of signal delay may be caused. In the case where the number of pixels in a liquid crystal display device is small, the above-described problem of signal delay is negligible, while in the case where the size and the definition of a liquid crystal display device are increased and the number of pixels is increased, the above-mentioned parasitic capacitance prevents an increase in driving speed of the liquid crystal display device.

REFERENCE

[Patent Document 1] PCT International Publication No. 2005/090520

SUMMARY OF THE INVENTION

In view of the foregoing problems, one object of the present invention is to provide a liquid crystal display device and a manufacturing method thereof in which a decrease in driving speed can be suppressed by avoiding the increase in parasitic capacitance even though the number of pixels is increased.

In order to achieve high contrast of a liquid crystal display device, white transmittance (light transmittance in white display) needs to be high.

For higher white transmittance, it is important to form an electric field in a large region of a liquid crystal layer and liquid crystal molecules are controlled using the electric field. However, by application of a high voltage to a liquid crystal in order to generate an electric field in a large region between a pixel electrode and a common electrode, the liquid crystal layer is deteriorated.

Further, the electrode structure that is employed to prevent the deterioration of the liquid crystal layer in a horizontal electric field mode liquid crystal display device differs from manufacturer to manufacturer, and each electrode structure is unique and technically elaborate. However, it still cannot be said that the consideration of the electrode structure is enough; accordingly, it cannot be said that a method for manufacturing an electrode is sufficiently established. Therefore, proposals for an electrode with a novel structure that utilizes characteristics of a liquid crystal and a method for manufacturing the electrode are demanded.

Moreover, it is an object of an embodiment of the present invention to provide a high-quality horizontal electric field mode liquid crystal display device with increased contrast ratio.

Further, it is an object of an embodiment of the present invention to propose electrodes of a horizontal electric field mode liquid crystal display device and a manufacturing method thereof.

Furthermore, it is an object of an embodiment of the present invention to provide a high-quality moving image.

An embodiment of the invention disclosed herein is a liquid crystal display device which includes a first substrate and a second substrate, between which a liquid crystal layer is sandwiched; and a pixel region including pixels. Each of the pixels includes: a transistor; a first wiring electrically connected to the transistor; a second wiring which is electrically connected to the transistor, perpendicular to the first wiring, and separated or spaced from second wirings in other pixels; a first insulating film between the first wiring and the second wiring; a second insulating film covering the transistor and the second wiring; a connection electrode electrically connecting the second wiring to a second wiring in an adjacent pixel with the first wiring positioned between the pixel and the adjacent pixel; a first electrode layer electrically connected to the transistor and in contact with the liquid crystal layer; and a second electrode layer positioned between parts of the first electrode layer and in contact with the liquid crystal layer. The second wiring is positioned above the first wiring. The connection electrode overlaps with part of the first wiring with the second insulating film interposed therebetween. The thickness of the connection electrode, the thickness of the first electrode layer, and the thickness of the second electrode layer are each more than or equal to 10% and less than or equal to 100% of the thickness of the liquid crystal layer. The connection electrode, the first electrode layer, and the second electrode layer are metal films and provided over the second insulating film.

Another embodiment of the invention disclosed herein is a liquid crystal display device which includes a first substrate and a second substrate, between which a liquid crystal layer is sandwiched; and a pixel region including pixels. Each of the pixels includes a transistor; a first wiring electrically connected to the transistor; a second wiring which is electrically connected to the transistor, perpendicular to the first wiring, and separated or spaced from second wirings in other pixels; a first insulating film between the first wiring and the second wiring: a second insulating film covering the transistor and the first wiring; a connection electrode electrically connecting the second wiring to a second wiring in an adjacent pixel with the first wiring positioned between the pixel and the adjacent pixel; a first electrode layer electrically connected to the transistor and in contact with the liquid crystal layer; and a second electrode layer positioned between parts of the first electrode layer and in contact with the liquid crystal layer. The first wiring is positioned above the second wiring. The connection electrode overlaps with part of the first wiring with the second insulating film interposed therebetween. The thickness of the connection electrode, the thickness of the first electrode layer, and the thickness of the second electrode layer are each more than or equal to 10% and less than or equal to 100% of the thickness of the liquid crystal layer. The connection electrode, the first electrode layer, and the second electrode layer are metal films and provided over the second insulating film.

According to another embodiment of the invention disclosed herein, in the above-described structure, a third insulating film is provided over and in contact with the connection electrode, the first electrode layer, and the second electrode layer, and the third insulating film may have a light-shielding property.

According to another embodiment of the invention disclosed herein, in the above-described structure, a third insulating film is provided over and in contact with the connection electrode, the first electrode layer, and the second electrode layer, and the third insulating film may be in contact with the second substrate.

According to another embodiment of the invention disclosed herein, in the above-described structure, the third insulating film may have a light-shielding property.

According to another embodiment of the invention disclosed herein, the second wiring, the second wiring in the adjacent pixel with the first wiring positioned between the pixel and the adjacent pixel, and the connection electrode are electrically connected to each other through openings provided in the second insulating film.

According to another embodiment of the invention disclosed herein, the liquid crystal layer preferably includes a liquid crystal exhibiting a blue phase.

According to another embodiment of the invention disclosed herein, a third wiring which is provided parallel to the first wiring in a same layer as the first wiring and supplies a capacitor potential to the first electrode layer is preferably included.

According to another embodiment of the invention disclosed herein, the first electrode layer and the second electrode layer preferably have a comb-like shape.

According to another embodiment of the invention disclosed herein, the second insulating film preferably has a thickness of more than or equal to 500 nm and less than or equal to 5 µm.

In this specification and the like, the term such as "electrode" or "wiring" does not limit the function of the component. For example, an "electrode" is sometimes used as part of a "wiring", and vice versa. Further, the term "electrode" or "wiring" can also means a combination of a plurality of "electrodes" and "wirings" formed in an integrated manner.

Functions of a "source" and a "drain" might interchange when a transistor of opposite polarity is used or the direction of current flow is changed in circuit operation, for example. Therefore, the terms "source" and "drain" can be used to denote the drain and the source, respectively, in this specification.

Note that in this specification and the like, the term "electrically connected" includes the case where components are connected through an "object having any electric function." There is no particular limitation on the "object having any electric function" as long as electric signals can be transmitted and received between components that are connected through the object.

For example, an electrode, a wiring, or the like is disposed as the "object having any electric function" between the components. The "object having any electric function" may be anything through which electric signals can be transmitted and received between the components.

In an embodiment of the present invention using the above-described structure, a second wiring is separated from a second wirings of other pixels, and the separated second wirings in the neighboring pixels are connected with each other with a connection electrode positioned over an insulating film to allow the connection electrode to intersect the first wiring, whereby the distance between the first wiring and the connection electrode between which the insulating film is interposed can be increased. Accordingly, parasitic capacitance in the intersection portion of wirings can be reduced. Total parasitic capacitance in the pixel region can be reduced, and a decrease in driving speed in the pixel region can be suppressed even when the number of pixels is increased.

A structure is disclosed in Japanese Published Patent Application No. 2011-017821 in which separated two wirings are connected by a connection electrode formed of a transparent conductive material. However, high resistance of the transparent conductive material results in increase of the wirings.

In an embodiment of the present invention using the above-described structure, by using a low-resistance metal as a material of the connection electrode and making the thickness of the connection electrode large, wiring resistance can be reduced; accordingly, a decrease in driving speed of a liquid crystal display device can be suppressed.

In an embodiment of the present invention, by using the above-described structure, a high-quality moving image can be provided.

In an embodiment of the present invention using the above-described structure, by increasing the thicknesses of the first electrode layer functioning as a pixel electrode and the second electrode layer functioning as a common electrode, surface areas of the first electrode layer and the second electrode layer can be expanded in the film thickness direction of the liquid crystal layer (three-dimensionally).

This enables an electric field to be applied in a large region of the liquid crystal layer at the time of voltage application between the first electrode layer and the second electrode layer and also enables liquid crystal molecules to be controlled with the use of the electric field. Accordingly, a liquid crystal display device with horizontal electric field mode, particularly a liquid crystal display device in which a liquid crystal exhibiting a blue phase is used, with the contrast ratio increased by increasing white transmittance, and a method for manufacturing such a liquid crystal display device can be provided.

In an embodiment of the present invention using the above-described structure, the first electrode layer functioning as a pixel electrode, the second electrode layer functioning as a common electrode, and the connection electrode can be formed in the same layer at the same time; accordingly, the process can be simplified.

BRIEF DESCRIPTION OF THE DRAWINGS

In the accompanying drawings.

DETAILED DESCRIPTION OF THE INVENTION

Figure 1:
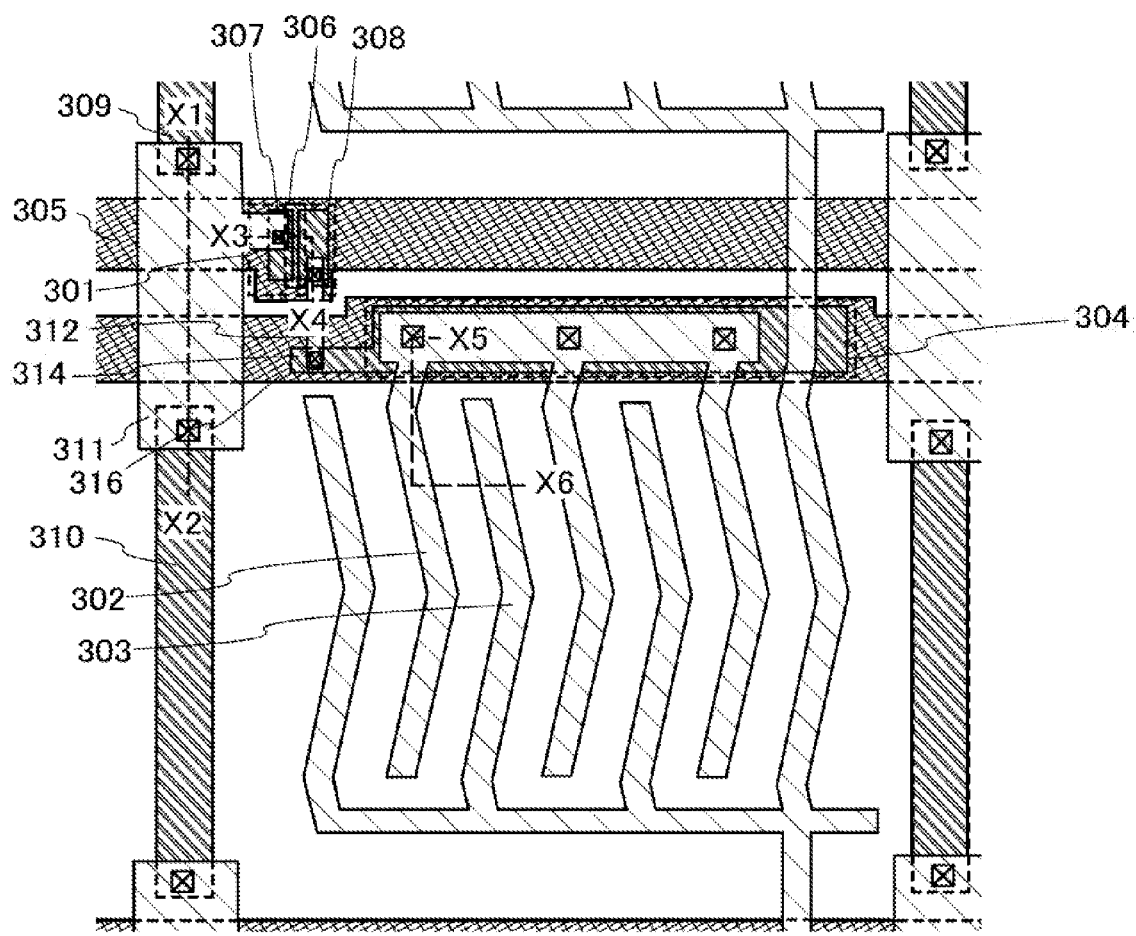
FIG. 1 is a top view of a pixel of a liquid crystal display device according to an embodiment of the present invention.

Embodiments will be described in detail with reference to the accompanying drawings. Note that the present invention is not limited to the description below, and it is easily understood by those skilled in the art that a variety of modifications can be made to the modes and details without departing from the spirit and scope of the present invention. Therefore, the present invention should not be construed as being limited to the description in the following embodiments. Note that in the structures described below, the same portions or portions having similar functions are denoted by the same reference numerals in common in different drawings and repetitive description thereof will be omitted.

Note that in each drawing described in this specification, the size, the layer thickness, or the region of each component may be exaggerated for clarity in some cases. Therefore, embodiments of the present invention are not limited to such scales.

Note that terms such as "first", "second", and "third" in this specification or the like are used in order to avoid confusion among components, and the terms do not limit the components numerically. Therefore, for example, the term "first" can be replaced with the term "second", "third", or the like as appropriate. Further, formation of a plurality of components in the same layer means that the plurality of components are formed simultaneously and exist in the same layer.

Embodiment 1

In this embodiment, a liquid crystal display device according to an embodiment of the present invention and a method for manufacturing the liquid crystal display device will be described with reference to FIG. 1, FIG. 2, FIG. 3, FIGS. 4A to 4D, and FIGS. 5A and 5B. A transistor included in the liquid crystal display device according to an embodiment of the present invention is a bottom-gate inverted staggered transistor. A structure in which separated upper wirings are electrically connected to each other with a connection electrode to allow the connection electrode to intersect a lower wiring will be used as an example.

Figure 2:
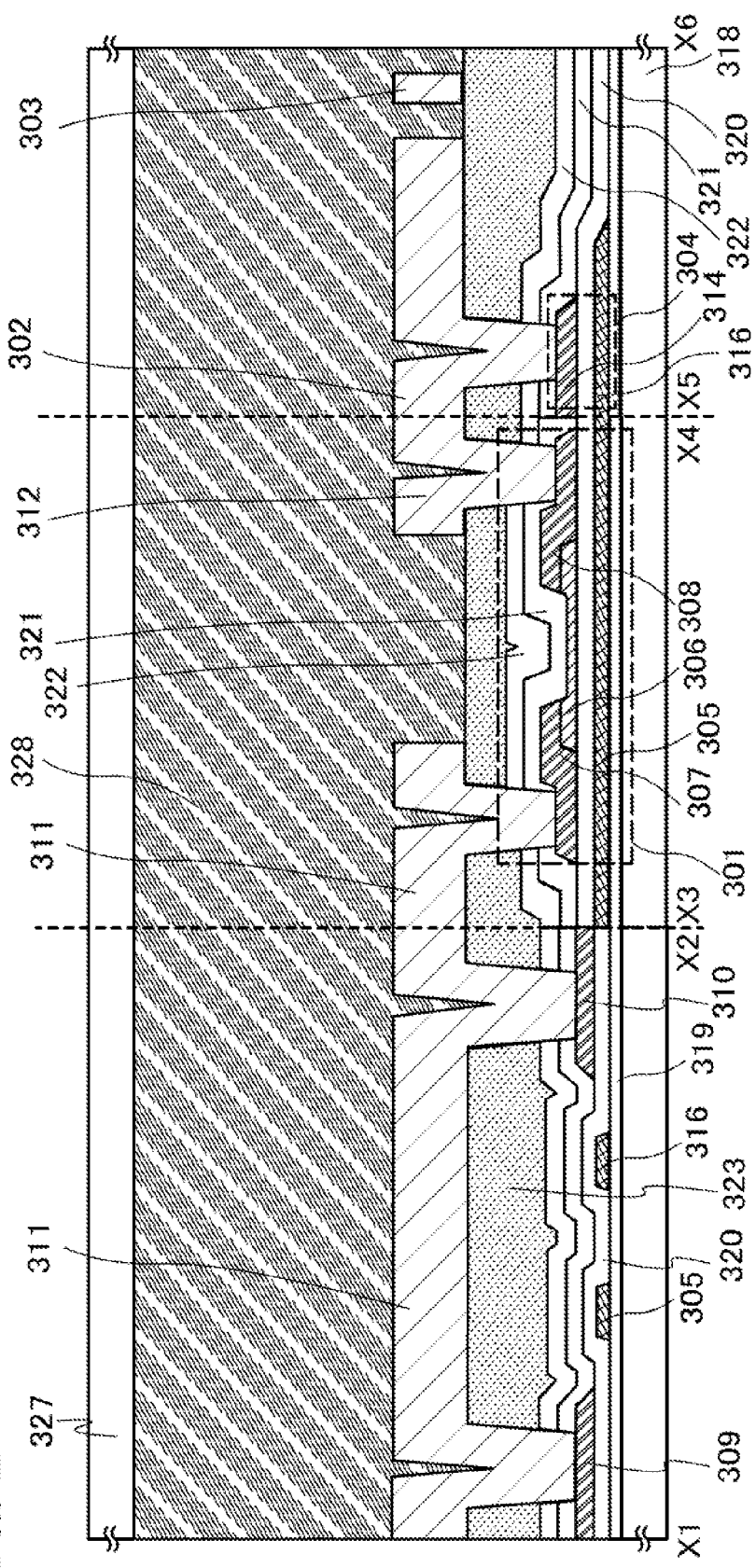
FIG. 2 is a cross-sectional view of a pixel of a liquid crystal display device according to an embodiment of the present invention.

A pixel region in a liquid crystal display device according to an embodiment of the present invention includes a plurality of first wirings, a plurality of second wirings, a plurality of transistors, and a first substrate and a second substrate between which a liquid crystal layer is interposed. A structure of part of the pixel region of the liquid crystal display device according to an embodiment of the present invention will be described. FIG. 1 is a plan view of the liquid crystal display device and illustrates one pixel. In the liquid crystal display device described in this embodiment, a plurality of such pixels is provided in matrix. FIG. 2 is a cross-sectional view taken along line X1-X2, line X3-X4, line X5-X6 in FIG. 1.

Specific structures of components of the liquid crystal display device in this embodiment will be described below.

One pixel in the active-matrix liquid crystal display device including a transistor illustrated in FIG. 1 and FIG. 2 includes a transistor 301, a first electrode layer 302 functioning as a pixel electrode layer, a second electrode layer 303 functioning as a common electrode layer, and a capacitor 304.

A structure of the transistor 301 will be described first. As shown in FIG. 2, the transistor 301 includes, over a first substrate 318, an insulating film 319, a first wiring 305 over the insulating film 319, an insulating film 320 functioning as a gate insulating film over the first wiring 305, a semiconductor layer 306 formed in a position overlapping with the first wiring 305 with the insulating film 320 interposed therebetween, a source electrode 307 and a drain electrode 308 over the insulating film 320 and the semiconductor layer 306, an insulating film 321 over the semiconductor layer 306, the source electrode 307, and the drain electrode 308, and an insulating film 322 over the insulating film 321.

Specific structures of each component of the transistor 301 will be described later in the description of a method for manufacturing a liquid crystal display device according to an embodiment of the present invention.

In the transistor 301, the source electrode 307 is electrically connected to a first connection electrode 311 through an opening provided in the insulating film 321, the insulating film 322, and an insulating film 323, which are positioned over the source electrode 307. The drain electrode 308 is electrically connected to a second connection electrode 312 through an opening provided in the insulating film 321, the insulating film 322, and the insulating film 323, which are positioned over the drain electrode 308. A conductive film 314 is electrically connected to the first electrode layer 302 functioning as a pixel electrode through an opening provided in the insulating film 321, the insulating film 322, and the insulating film 323, which are positioned over the conductive film 314.

In this embodiment, the source electrode 307 is electrically connected to the first connection electrode 311. A structure in which electric signals are transmitted and received through an electrode, a wiring, or the like provided between the source electrode 307 and the first connection electrode 311 may also be used. Similarly, the drain electrode 308 is electrically connected to the second connection electrode 312. A structure in which electric signals are transmitted and received through an electrode, a wiring, or the like provided between the drain electrode 308 and the second connection electrode 312 may also be used. Similarly, the conductive film 314 is electrically connected to the first electrode layer 302 functioning as a pixel electrode. A structure in which electric signals are transmitted and received through an electrode, a wiring, or the like provided between the conductive film 314 and the first electrode layer 302 may also be used.

The first wiring 305 functions as a gate electrode and also as a scan line. A second wiring 310 and a second wiring 309 which is provided in an adjacent pixel are electrically connected to the first connection electrode 311 and each function as a signal line. The first wiring 305 is orthogonal to the second wiring 309 and the second wiring 310 by the first connection electrode 311.

In this embodiment, the second wiring 309 and the second wiring 310 are electrically connected to the first connection electrode 311. A structure in which electric signals are transmitted and received through an electrode, a wiring, or the like provided between the second wiring 309 and the first connection electrode 311 and between the second wiring 310 and the first connection electrode 311 may be used.

As illustrated in FIG. 1, the second wiring 309 and the second wiring 310 are provided parallel to each other (extend in the vertical direction in the drawing) and apart from each other. The first wiring 305 is provided to extend in a direction perpendicular to the second wiring 309 and the second wiring 310 (in the horizontal direction in the drawing) and to be apart from the second wiring 309 and the second wiring 310. A third wiring 316 is positioned adjacent to the first wiring 305 and extends in a direction parallel to the first wiring 305, that is, in a direction perpendicular to the second wiring 309 and the second wiring 310 (in the horizontal direction in the drawing). The capacitor is formed in a region where the third wiring 316 and the conductive film 314 overlap with each other.

The second wiring 309 and the second wiring 310, which are provided by division in a portion where the scan line and the signal line intersect with each other and function as signal lines, are connected with the first connection electrode 311 positioned over the planarized insulating film 323. Furthermore, it is preferred that the thickness of the insulating film 323 provided over the first wiring 305 and the third wiring 316 is adjusted to be more than or equal to 500 nm and less than or equal to 5 μm. Accordingly, the insulating film 323 having a large thickness is provided, between the first connection electrode 311 and the first wiring 305. Thus, the distance between the first connection electrode 311 and the first wiring 305 can be increased. Accordingly, parasitic capacitance of the intersection portion can be reduced. Total parasitic capacitance in the pixel region can be reduced, and a decrease in driving speed in the pixel region can be suppressed even when the number of pixels is increased.

By using a low-resistance metal as a material of the first connection electrode 311 over the insulating film 323 and increasing the thickness of the first connection electrode 311, wiring resistance can be reduced; accordingly, a decrease in driving speed of the liquid crystal display device can be suppressed.

Note that although the second wiring 309, the second wiring 310, and the source electrode 307 are electrically connected to each other with the first connection electrode 311 in this embodiment, the present invention is not limited thereto. The first connection electrode 311 is electrically connected to at least the second wiring 309 and the second wiring 310, and the source electrode 307 may be electrically connected to one of the second wiring 309 and the second wiring 310.

Next, the structure of the capacitor 304 will be described. The capacitor 304 includes the third wiring 316 functioning as a capacitor line, the insulating film 320 over the third wiring 316, and the conductive film 314 over the insulating film 320. A portion where the third wiring 316, the insulating film 320, and the conductive film 314 overlap with each other functions as the capacitor 304.

The wiring functioning as a capacitor line is not limited to the third wiring 316. For example, a structure in which the first wiring functioning as a scan line also functions as a capacitor line can be used. Further, the structure of the conductive film 314 is also not limited thereto, and a structure in which the drain electrode 308 also functions as the conductive film 314 can be used. Furthermore, it is also possible to form a capacitor by a structure in which the conductive film 314 overlaps with the third wiring 316, the insulating film 320, the insulating film 321, the insulating film 322, the insulating film 323, and the first electrode layer 302 (or the second electrode layer 303).

Figure 3:
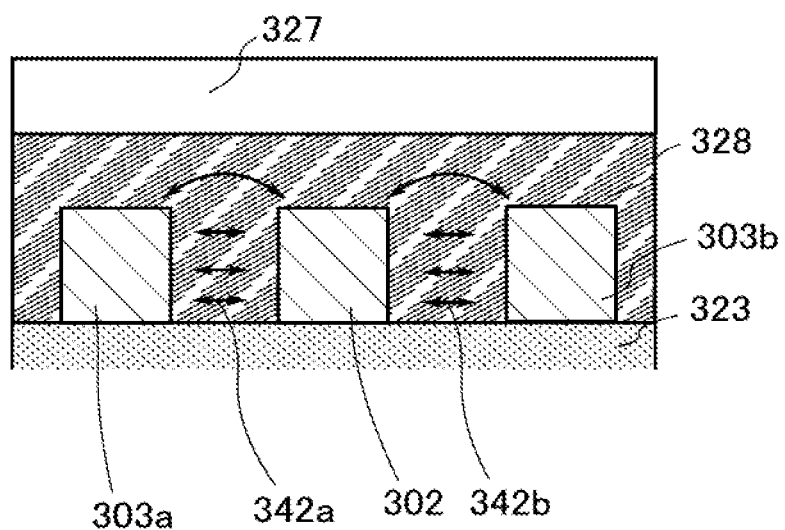
FIG. 3 is a view of an electric field mode of a liquid crystal display device according to an embodiment of the present invention.

Next, the first electrode layer 302 functioning as a pixel electrode and the second electrode layer 303 functioning as a common electrode will be described with reference to FIG. 3. FIG. 3 is a cross-sectional view illustrating an electric field between the pixel electrode and the common electrode in the liquid crystal display device.

As illustrated in FIG. 3, the first electrode layer 302 functioning as a pixel electrode, a second electrode layer 303a functioning as a common electrode, and a second electrode layer 303b functioning as a common electrode are provided over the insulating film 323. The thickness of the first electrode layer 302, the thickness of the second electrode layer 303a, and the thickness of the second electrode layer 303b are each a thickness that enables an electric field to be generated in a large region in a film thickness direction in a liquid crystal layer 328 (three-dimensionally) and also enables liquid crystal molecules to be controlled with the use of the electric field. Specifically, the first electrode layer 302, the second electrode layer 303a, and the second electrode layer 303b each have a large thickness of more than or equal to 10% and less than or equal to 100% of the thickness of the liquid crystal layer 328 and are each provided so as to project from a surface on the liquid crystal layer 328 side of the insulating film 323 to the liquid crystal layer 328.

The first electrode layer 302, the second electrode layer 303a, and the second electrode layer 303b are columnar. The shapes of the first electrode layer 302, the second electrode layer 303a, and the second electrode layer 303b can be a rib shape, a truncated conical or pyramidal shape with a flat top surface and a trapezoidal cross section, or the like.

When the first electrode layer 302, the second electrode layer 303a, and the second electrode layer 303b f are columnar as illustrated in FIG. 3, the surface areas of the first electrode layer 302, the second electrode layer 303a, and the second electrode layer 303b can be expanded in the film thickness direction of the liquid crystal layer 328 (three-dimensionally). Accordingly, as illustrated in FIG. 3, an electric field indicated by an arrow 342a is applied to a large region in the film thickness direction between the first electrode layer 302 and the second electrode layer 303a in the liquid crystal layer, and an electric field indicated by an arrow 342b is applied to a large region in the film thickness direction between the first electrode layer 302 and the second electrode layer 303b in the liquid crystal layer. Note that as shown by the arrow 342a and the arrow 342b, lines of electric force are curved above top surfaces of (in upper regions between) the first electrode layer 302 and the second electrode layers 303a and 303b.

Therefore, liquid crystal molecules can respond in the entire liquid crystal layer 328 and white transmittance can be improved. In addition, the contrast ratio, which is a ratio of white transmittance to black transmittance (light transmittance in black display), can be increased. Further, an electric field can be effectively applied even to a highly viscous liquid crystal material exhibiting a blue phase; therefore, reduction in power consumption can also be achieved.

The shapes of the first electrode layer 302, the second electrode layer 303a, and the second electrode layer 303b in the pixel region are preferably a comb-like pattern which does not form a closed space. The first electrode layer 302, the second electrode layer 303a, and the second electrode layer 303b are provided over the same insulating surface without being in contact with each other so that their comb-like patterns engage with each other.

Note that although the second electrode layer 303 extends in a direction orthogonal to the first wiring in this embodiment, the present invention is not limited thereto and the second electrode layer 303 may extend in a direction parallel to the first wiring. The second electrode layer 303 extends to connect to an external power source at an end of the pixel region.

A second substrate 327 is provided to face the first substrate 318. The liquid crystal layer 328 is provided between the first substrate 318 and the second substrate 327. The liquid crystal layer 328 is provided also between the first electrode layer 302 and the second electrode layer 303. A region which includes the first electrode layer 302, the second electrode layer 303, and the liquid crystal layer 328 functions as a liquid crystal element.

Although the bottom-gate inverted staggered transistor is used as the transistor 301 in this embodiment, the transistor 301 is not limited thereto. For example, the transistor 301 may be a top-gate transistor.

In this embodiment, the separated upper second wirings are electrically connected to each other with a connection electrode to allow the connection electrode to intersect with the first wiring. However, the present invention is not limited to this structure. For example, a structure in which the lower first wiring is divided instead of the upper second wiring and the separated lower first wirings are electrically connected to each other with a connection electrode may also be used.

A color filter that selectively transmits light in a specific wavelength region may be provided over the second substrate 327.

Next, a method for manufacturing a liquid crystal display device according to an embodiment of the present invention will be described with reference to FIGS. 4A to 4D and FIGS. 5A and 5B. FIGS. 4A to 4D and FIGS. 5A and 5B are cross-sectional views illustrating the method for manufacturing a liquid crystal display device according to an embodiment of the present invention.

Figure 4A:
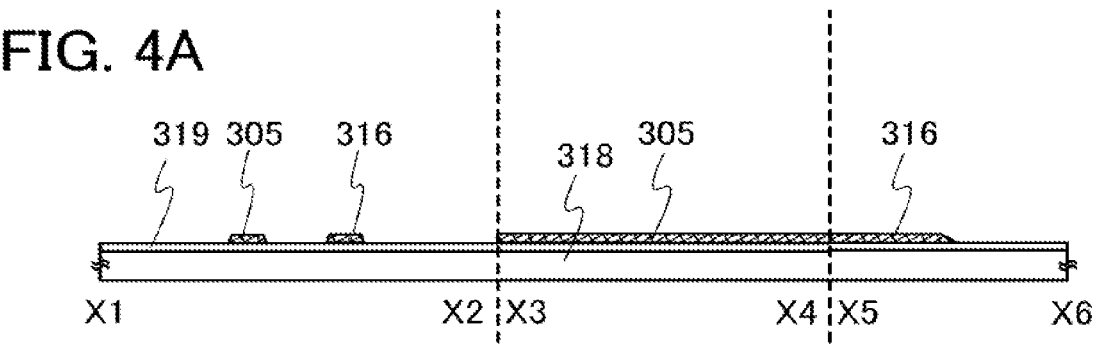
FIGS. 4A to 4D illustrate a method for manufacturing a pixel of a liquid crystal display device according to an embodiment of the present invention.

As illustrated in FIG. 4A, after the insulating film 319 is formed over the first substrate 318, the first wiring 305 and the third wiring 316 are formed over the insulating film 319.

Although there is no particular limitation on a material which can be used as the first substrate 318, it is necessary that the material have at least heat resistance high enough to withstand heat treatment performed later. For example, a glass substrate formed by a fusion process or a float process, a quartz substrate, a semiconductor substrate, a ceramic substrate, or the like can be used as the first substrate 318. In the case where the temperature of heat treatment that is to be performed later is high, a glass substrate whose strain point is higher than or equal to 730° C. is preferably used.

It is not always necessary to provide the insulating film 319, but the insulating film 319 can prevent an alkali metal or an alkaline earth metal contained in the first substrate 318 from diffusing to the semiconductor layer 306 formed later, thereby preventing an adverse effect on characteristics of the transistor 301. The insulating film 319 is formed using an insulating material such as silicon oxide, silicon nitride, silicon oxynitride, silicon nitride oxide, or aluminum nitride.

In this specification, an "oxynitride" typified by silicon oxynitride refers to a substance in which the amount of oxygen is larger than that of nitrogen, and a "nitride oxide" typified by silicon nitride oxide refers to a substance in which the amount of nitrogen is larger than that of oxygen.

The first wiring 305 and the third wiring 316 can be formed by forming a conductive film over the insulating film 319 and processing (patterning) the conductive film into desired shapes. The conductive film can be formed by a CVD method, a sputtering method, a vapor deposition method, a spin coating method, or the like. As the conductive film for forming the first wiring 305 and the third wiring 316, any of the following materials can be used: an element selected from aluminum, chromium, copper, tantalum, titanium, molybdenum, or tungsten; an alloy including any of these elements; an alloy film including the above elements in combination; and the like.

Further, the conductive film processed into the first wiring 305 and the third wiring 316 may have a single-layer structure or a stacked structure of two or more layers. For example, a single-layer structure of an aluminum film containing silicon; a two-layer structure of an aluminum film and a titanium film stacked thereover; a three-layer structure in which a titanium film, an aluminum film, and a titanium film are stacked in this order; and the like can be given.

Alternatively, a structure may be employed in which a film of a refractory metal such as chromium, tantalum, titanium, molybdenum, or tungsten is stacked over or below a metal film of aluminum or copper. Aluminum or copper is preferably combined with a refractory metal material so as to prevent problems caused by its low heat resistance property and a high corrosion property. As the refractory metal material, molybdenum, titanium, chromium, tantalum, tungsten, neodymium, scandium, yttrium, or the like can be used.

In the case where heat treatment, is performed after formation of the conductive film, the conductive film preferably has heat resistance enough to withstand the heat treatment.

In this embodiment, a conductive film formed by stacking a 50-nm-thick titanium film, a 100-nm-thick aluminum film, and a 50-nm-thick titanium film in this order is used for forming the first wiring 305 and the third wiring 316.

Alternatively, the first wiring 305 and the third wiring 316 may be selectively formed using a droplet discharge method without using a mask. Note that a droplet discharge method means a method in which droplets containing a composition are discharged or ejected from fine pores to form a pattern, and includes an ink-jet method and the like.

The first wiring 305 and the third wiring 316 can be formed by forming a conductive film and then etching the conductive film into desired tapered shapes using a reactive ion etching (RIE) method, an inductively coupled plasma (ICP) etching method, an electron cyclotron resonance (ECR) etching method, a parallel plate type (capacitively coupled type) etching method, a magnetron plasma etching method, a dual-frequency plasma etching method, a helicon wave plasma etching method, or the like under appropriately adjusted etching conditions (e.g., the amount of electric power applied to a coiled electrode layer, the amount of electric power applied to an electrode layer on the substrate side, and the electrode temperature on the substrate side). In addition, angles and the like of the tapered shapes can also be controlled by a shape of a mask. As an etching gas, a chlorine-based gas such as chlorine, boron chloride, silicon chloride, or carbon tetrachloride; a fluorine-based gas such as carbon tetrafluoride, sulfur fluoride, or nitrogen fluoride; or oxygen can be used as appropriate.

Figure 4B:
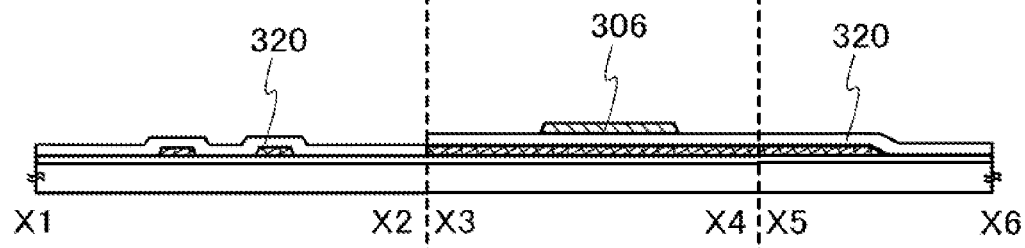

Next, as illustrated in FIG. 4B, the insulating film 320 is formed over the first wiring 305 and the third wiring 316, and then the semiconductor layer 306 is formed in a position overlapping with the first wiring 305 with the insulating film 320 interposed therebetween.

The insulating film 320 can be formed of a single layer or a stack of layers containing silicon oxide, silicon nitride oxide, silicon oxynitride, silicon nitride, hafnium oxide, aluminum oxide, tantalum oxide, yttrium oxide, hafnium silicate (HfSi$_x$O$_y$, (x>0, y>0)), hafnium silicate (HfSi$_x$O$_y$ (x>0, y>0)) to which nitrogen is added, hafnium aluminate (HfAl$_x$O$_y$, (x>0, y>0)) to which nitrogen is added, or the like by, for example, plasma CVD, sputtering, or the like.

The insulating film 320 can have a thickness of more than or equal to 1 nm and less than or equal to 500 nm, preferably more than or equal to 10 nm and less than or equal to 400 nm, for example. In this embodiment, a single-layer insulating film containing silicon nitride with a thickness of about 300 nm formed by a plasma CVD method is used as the insulating film 320.

In a process of forming the insulating film 320 by a plasma CVD method, glow discharge plasma is generated by applying high-frequency power with a frequency of 3 MHz to 30 MHz, typically 13.56 MHz or 27.12 MHz, or high-frequency power in the VHF band with a frequency of 30 MHz to about 300 MHz, typically 60 MHz. Alternatively, glow discharge plasma is generated by applying high frequency power at a microwave frequency of 1 GHz or more. Note that pulsed oscillation by which high-frequency power is applied in a pulsed manner or continuous oscillation by which high-frequency power is applied continuously can be employed. In addition, by superimposing high-frequency power in the HF band and high-frequency power in the VHF band on each other, unevenness of plasma across a large-sized substrate is also reduced, so that uniformity can be increased and the deposition rate can be increased. When the insulating film 320 is formed at a high frequency of 1 GHz or more with a microwave plasma CVD apparatus, the breakdown voltage between the first wiring 305 functioning as a gate electrode and the source electrode 307 and the drain electrode 308 can be improved, whereby a highly reliable transistor 301 can be obtained.

Formation of a silicon oxide layer by a CVD method using organosilane gas as the insulating film 320 enables higher crystallinity of the semiconductor layer formed later; accordingly, on-state current, mobility, and reliability of the transistor 301 can be increased. As the organosilane gas, a silicon-containing compound such as tetraethoxysilane (TEOS) (chemical formula: Si(OC$_2$H$_5$)$_4$), tetramethylsilane (TMS) (chemical formula: Si(CH$_3$)$_4$), tetramethylcyclotetrasiloxane (TMCTS), octamethylcyclotetrasiloxane (OMCTS), hexamethyldisilazane (HMDS), triethoxysilane (chemical formula: SiH(OC$_2$H$_5$)$_3$), or trisdimethylaminosilane (chemical formula: SiH(N(CH$_3$)$_2$)$_3$) can be used.

The semiconductor layer 306 can be formed using the following material: an amorphous semiconductor manufactured by a sputtering method or a vapor-phase growth method using a semiconductor material gas typified by silane or germane; a polycrystalline semiconductor formed by crystallizing the amorphous semiconductor with the use of light energy or thermal energy; a microcrystalline (also referred to as semiamorphous or microcrystal) semiconductor; or the like. The semiconductor layer can be formed by a sputtering method, an LPCVD method, a plasma CVD method, or the like.

The microcrystalline semiconductor has short-range order to medium-range order, and includes a crystal grain boundary, a twin crystal boundary, dislocation, and lattice distortion. Columnar-like or needle-like crystals grow in a normal direction with respect to a substrate surface. The Raman spectrum of microcrystalline silicon, which is a typical example of a microcrystalline semiconductor, is located in a lower wavenumber side than 520 cm$^{-1}$ which represents single crystal silicon. That is, the peak of the Raman spectrum of the microcrystalline silicon exists between 520 cm$^{-1}$ which represents single crystal silicon and 480 cm$^{-1}$ which represents amorphous silicon. In addition, microcrystalline silicon includes hydrogen or halogen at 1 atomic % or more in order to terminate dangling bonds. Moreover, a microcrystalline semiconductor film has increased stability and is preferable when containing a rare gas element such as helium, argon, krypton, or neon to further enhance lattice distortion. Such a microcrystalline semiconductor is disclosed in, for example, U.S. Pat. No. 4,409,134.

A typical example of an amorphous semiconductor is hydrogenated amorphous silicon, while a typical example of a crystalline semiconductor is polysilicon and the like. Examples of polysilicon (polycrystalline silicon) are high-temperature polysilicon that contains polysilicon formed at a process temperature of 800° C. or higher as its main component, low-temperature polysilicon that contains polysilicon formed at a process temperature of 600° C. or lower as its main component, and polysilicon obtained by crystallizing amorphous silicon using an element that promotes crystallization or the like. Needless to say, a microcrystalline semiconductor or a semiconductor that includes a crystalline phase in part of a semiconductor layer can be used as described above. Alternatively, a microcrystalline semiconductor layer or a crystalline semiconductor layer may be used by being stacked with an amorphous semiconductor layer.

As a material of the semiconductor, as well as an element such as silicon (Si) or germanium (Ge), a compound semiconductor such as GaAs, InP, SiC, ZnSe, GaN, or SiGe can be used.

Alternatively, the semiconductor layer 306 can be formed using an oxide semiconductor film. In the case of using an oxide semiconductor film as the semiconductor layer 306, an oxide semiconductor material containing indium, an oxide semiconductor material containing indium and gallium, or the like can be used, for example.

As a material of the oxide semiconductor film, any of the following materials can be used: a four-component metal oxide such as an In—Sn—Ga—Zn—O-based material; three-component metal oxides such as an In—Ga—Zn—O-based material, an In—Sn—Zn—O-based material, an In—Al—Zn—O-based material, a Sn—Ga—Zn—O-based material, an Al—Ga—Zn—O-based material, and a Sn—Al—Zn—O-based material; two-component metal oxides such as an In—Zn—O-based material, a Sn—Zn—O-based material, an Al—Zn—O-based material, a Zn—Mg—O-based material, a Sn—Mg—O-based material, an In—Mg—O-based material, and an In—Ga—O-based material; and single-component metal oxides such as an In—O-based material, a Sn—O-based material, and a Zn—O-based material. In addition, the above materials may contain $SiO_2$. Here, for example, an In—Ga—Zn—O-based material means an oxide film containing indium (In), gallium (Ga), and zinc (Zn), and there is no particular limitation on the composition ratio. Further, the In—Ga—Zn—O-based material may contain an element other than In, Ga, and Zn.

As the oxide semiconductor film, a thin film using a material represented by the chemical formula, $InMO_3(ZnO)_m$ (m>0) can be used. Here, M represents one or more metal elements selected from Ga, Al, Mn, and Co. For example, M may be Ga, Ga and Al, Ga and Mn, Ga and Co, or the like.

The oxide semiconductor film is preferably formed by a method in which hydrogen, water, or the like does not easily enter the oxide semiconductor film. For example, the oxide semiconductor film can be formed by a sputtering method or the like. The oxide semiconductor film may be formed in a rare gas (typically argon) atmosphere, an oxygen atmosphere, a mixed atmosphere containing a rare gas and oxygen, or the like. Moreover, it is preferable that an atmosphere using a high-purity gas in which impurities containing hydrogen atoms, such as hydrogen, water, a compound having a hydroxyl group, and a hydride, are sufficiently removed be used because entry of hydrogen, water, a compound having a hydroxyl group, and a hydride into the oxide semiconductor film can be prevented. Further, heat treatment is preferably performed on the oxide semiconductor film after formation. By performing heat treatment, impurities such as water or hydrogen contained in the oxide semiconductor film can be removed; alternatively, oxygen can be supplied to the oxide semiconductor film.

By using such an oxide semiconductor film having a wide band gap for the semiconductor layer 306, a current value in an off state (off-state current value) can be small. Accordingly, an electric signal such as an image signal can be held for a longer period, and a writing interval can be set longer in an on state. Accordingly, the frequency of refresh operation can be reduced, which leads to an effect of suppressing power consumption.

In a process of forming the semiconductor layer, the electrode layer, and the wiring layer, an etching step is used to process thin films into desired shapes. Dry etching or wet etching can be used for the etching step.

Examples of the etching apparatus used for dry etching include an etching apparatus using a reactive ion etching method (an RIE method), or a dry etching apparatus using a high-density plasma source such as ECR or ICP.

In order to etch the films into desired shapes, etching conditions (the amount of electric power applied to a coil-shaped electrode, the amount of electric power applied to an electrode on a substrate side, the temperature of the electrode on the substrate side, or the like) are adjusted as appropriate.

The etching conditions (such as an etchant, etching time, and temperature) are appropriately adjusted depending on the material so that the material can be etched into a desired shape.

Figure 4C:
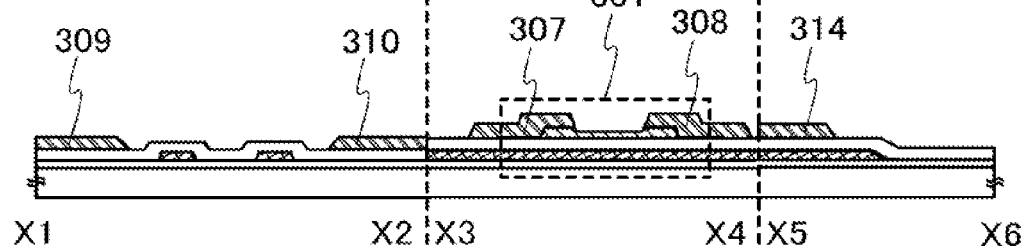

Next, a conductive film is formed to cover the insulating film 320 and the semiconductor layer 306, and then the conductive film is processed (patterned) in a manner similar to that of processing of the first wiring 305 and the third wiring 316, so that the second wiring 309, the second wiring 310, the source electrode 307, the drain electrode 308, and the conductive film 314 are formed as illustrated in FIG. 4C.

In this embodiment, in formation of the source electrode 307 and the drain electrode 308, part of the semiconductor layer 306 of the transistor 301 is also etched, so that the semiconductor layer 306 has a groove portion (a depression).

The second wiring 309, the second wiring 310, the source electrode 307, the drain electrode 308, and the conductive film 314 can be formed using a material and a stacked structure which are similar to those of the first wiring 305 and the third wiring 316.

Note that a Cu—Mg—Al alloy, a Cu—Mg—O alloy, a Cu—Ca—O alloy, a Cu—Mg—Al—O alloy, a Mo—Ti alloy, Ti, and Mo have high adhesion to an oxide film. Therefore, when a conductive film is formed using a stack of a lower conductive layer of a Cu—Mg—Al alloy, a Cu—Mg—O alloy, a Cu—Ca—O alloy, a Cu—Mg—Al—O alloy, a Mo—Ti alloy, Ti, or Mo and an upper conductive layer of Cu as the second wiring 309, the second wiring 310, and the conductive film 314, the adhesion between the insulating film 320 and the second wiring 309, the second wiring 310, and the conductive film 314 can be increased in the case of the insulating film 320 being an oxide film of silicon oxide, silicon oxynitride, hafnium oxide, aluminum oxide, tantalum oxide, yttrium oxide, or the like.

Through the above-described process, the transistor 301 as illustrated in FIG. 4C can be manufactured.

Figure 4D:
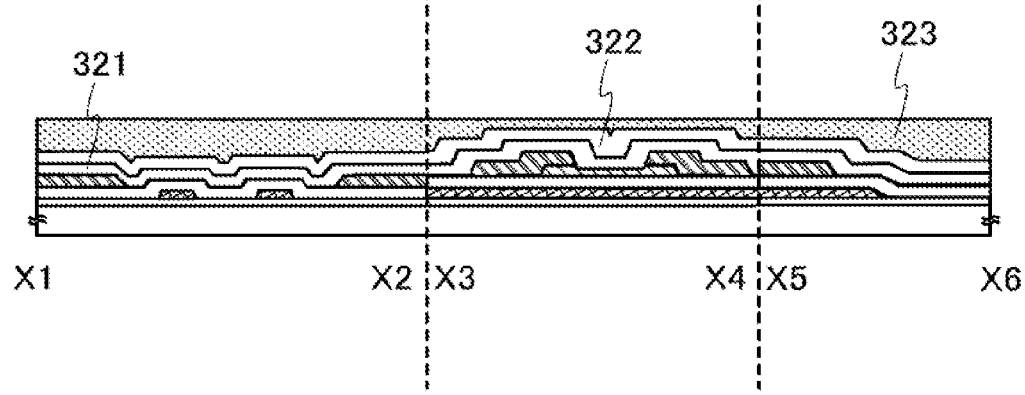

Next, as illustrated in FIG. 4D, the insulating film 321, the insulating film 322, and the insulating film 323 are formed. Although the insulating film 321, the insulating film 322, and the insulating film 323 are stacked in this embodiment, a single-layer insulating film or a stacked structure of two or more layers may be employed.

It is preferable that the insulating film of the single-layer structure or the insulating film that is closest to the second substrate among the stacked layers be a highly planar insulating film in order to uniform the heights of the first electrode layer 302, the second electrode layer 303, the first connection electrode 311, and the second connection electrode 312 which are formed later.

The insulating film 321 and the insulating film 322 can be formed using an inorganic insulating material such as silicon oxide, silicon nitride oxide, silicon nitride, hafnium oxide, aluminum oxide, or tantalum oxide. The insulating film 321 and the insulating film 322 can also be formed using an organic insulating material such as a polyimide or an acrylic resin. In addition to these materials, a low-dielectric constant material (a low-k material), a siloxane-based resin, PSG (phosphosilicate glass), BPSG (borophosphosilicate glass), or the like can be used. A siloxane-based resin refers to a material in which a skeleton structure is formed by the bond of silicon (Si) and oxygen (O). As well as hydrogen, fluorine, an organic group (e.g., an alkyl group or an aryl group), and a fluoro-containing organic group may be used as a substituent. For the formation of the insulating film 321 and the insulating film 322, the following method can be used depending on the material of the insulating film 321 and the insulating film 322: a CVD method, a sputtering method, a spin coating method, a dip coating method, a spray coating method, a droplet discharge method (e.g., an ink-jet method), a printing method (e.g., screen printing or offset printing).

For the insulating film 321 and the insulating film 322, a silicon oxide film formed by chemical vapor deposition using an organosilane can be used. For an organosilane, tetraethoxysilane (TEOS) (chemical formula: $Si(OC_2H_5)_4$), trimethylsilane (TMS) (chemical formula: $(CH_3)_3SiH$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), tris(dimethylamino)silane (chemical formula: $SiH(N(CH_3)_2)_3$), or the like can be used. Needless to say, silicon oxide, silicon oxynitride, silicon nitride, silicon nitride oxide, or the like may be formed using an inorganic slime such as monosilane, disilane, or trisilane.

The highly planar insulating film 323 can be formed using an organic material such as a polyimide, an acrylic resin, a benzocyclobutene-based resin, a polyamide, or an epoxy resin. Other than such organic materials, it is also possible to use a low-dielectric constant material (a low-k material) such as a siloxane-based resin, PSG (phosphosilicate glass), BPSG (borophosphosilicate glass), and the like. For the formation of the insulating film 323, the following method can be employed depending on the material of the insulating film 323: a spin coating method, a dipping method, a spray coating method, a droplet discharge method (e.g., an ink-jet method), a printing method (e.g., screen printing or offset printing).

The total thickness of the insulating film 321 and the insulating film 322 is preferably more than or equal to 100 nm and less than or equal to 1.5 μm, and further preferably more than or equal to 300 nm and less than or equal to 1.0 μm. The thickness of the highly planar insulating film 323 is preferably more than or equal to 500 nm and less than or equal to 5 μm, and further preferably more than or equal to 1.0 μm and less than or equal to 2.0 μm.

By making the thicknesses of the insulating film 321, the insulating film 322, and the insulating film 323 large, the distance between the first wiring and the first connection electrode can be increased. Accordingly, parasitic capacitance of the intersection portion can be reduced. Therefore, total parasitic capacitance in the pixel region can be reduced, and a decrease in driving speed in the liquid crystal display device can be suppressed even when the number of pixels is increased.

This embodiment employs a three-layer structure of the insulating film 321, the insulating film 322, and the highly planar insulating film 323, where the insulating film 321 and the insulating film 322 are formed of silicon nitride to have a total thickness of 300 nm and the insulating film 323 is formed of an acrylic resin to have a thickness of 1.5 μm.

Figure 5A:
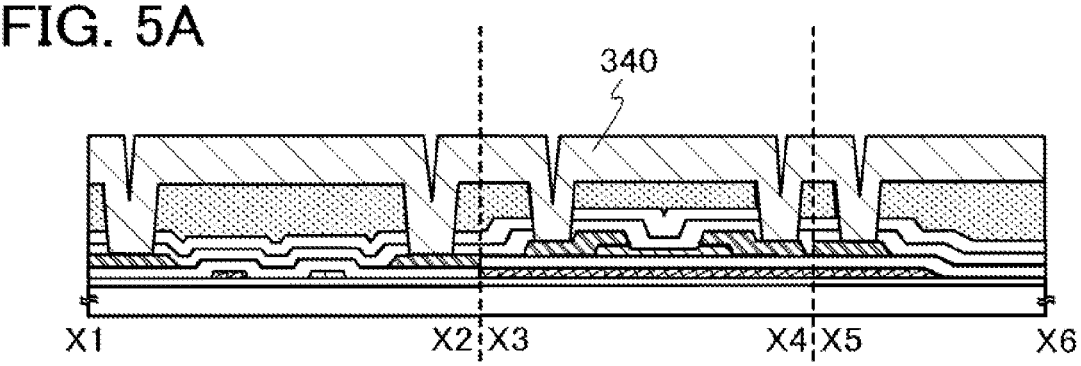
FIGS. 5A and 5B illustrate a method for manufacturing a pixel of a liquid crystal display device according to an embodiment of the present invention.

Next, as illustrated in FIG. 5A, openings are formed in the insulating film 321, the insulating film 322, and the insulating film 323 so as to expose part of the second wiring 309, part of the second wiring 310, part of the source electrode 307, part of the drain electrode 308, and part of the conductive film 314. Then, a conductive film 340 is formed over the insulating film 323 so as to be in contact with the second wiring 309, the second wiring 310, the source electrode 307, the drain electrode 308, and the conductive film 314 at the openings.

The conductive film 340 can be formed using a material and a stacked structure which are similar to those of the first wiring 305 and the third wiring 316. In order to suppress a decrease in driving speed in the liquid crystal display device, a low-resistance metal is preferably used. By using a low-resistance metal as a material of the first connection electrode 311 formed later and making the thickness of the first connection electrode 311 large, wiring resistance can be reduced; accordingly, a decrease in driving speed of the liquid crystal display device can be suppressed. Further, it is preferable that the thickness of the conductive film 340 be large in order to make the thicknesses of the first electrode layer 302 and the second electrode layer 303 formed later large and thereby easily apply a horizontal electric field to a liquid crystal. The thicknesses of the first connection electrode 311, the first electrode layer 302, and the second electrode layer 303 are each preferably more than or equal to 10% and less than or equal to 100%, further preferably more than or equal to 20% and less than or equal to 80% of the thickness of the liquid crystal layer 328.

Further, by forming a barrier-metal film by using titanium, which has a high reducing ability, under the conductive film 340, even if a thin oxide film is formed on the second wiring 309, the second wiring 310, the source electrode 307, the drain electrode 308, and the conductive film 314, the oxide film is reduced by titanium contained in the barrier metal film, so that preferable contact between the conductive film 340 and the second wiring 309, the second wiring 310, the source electrode 307, the drain electrode 308, and the conductive film 314 can be obtained.

Therefore, in the case of a three-layer structure in which a titanium film, an aluminum film, and a tungsten film are stacked in this order or a three-layer structure in which a titanium film, an aluminum film, and a tantalum nitride film are stacked in this order, in addition to the above-described two advantages, an advantage of lower contact resistance in a connection portion to the second wiring 309, the second wiring 310, the source electrode 307, the drain electrode 308, and the conductive film 314 can be obtained.

The thickness of the conductive film 340 is preferably more than or equal to 500 nm and less than or equal to 5 μm, further preferably more than or equal to 1 μm and less than or equal to 4 μm. In this embodiment, a 200-nm-thick titanium film, a 600-nm-thick aluminum film, and a 200-nm-thick tungsten film are stacked in this order to form the conductive film 340.

Figure 5B:
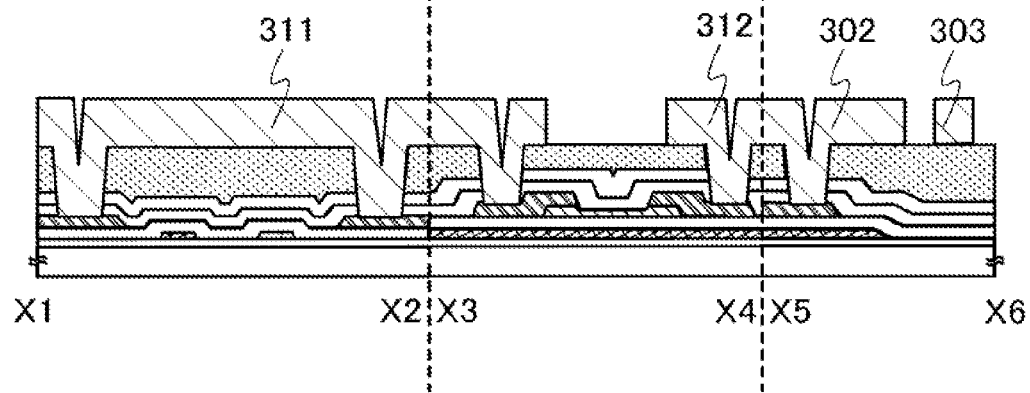

Next, as illustrated in FIG. 5B, the conductive film 340 is processed by dry etching, so that the first electrode layer 302, the second electrode layer 303, the first connection electrode 311, and the second connection electrode 312 each having an island shape are formed. The first connection electrode 311 is connected to the source electrode 307, the second wiring 309, and the second wiring 310 through openings formed in the insulating film 321, the insulating film 322, and the insulating film 323. The second connection electrode 312 is connected to the drain electrode 308 through an opening formed in the insulating film 321, the insulating film 322, and the insulating film 323. The first electrode layer 302 functioning as a pixel electrode is connected to the conductive film 314 through an opening formed in the insulating film 321, the insulating film 322, and the insulating film 323. The first electrode layer 302 is connected to the drain electrode 308 through the conductive film 314 and the second connection electrode 312.

The above dry etching can be performed by a dry etching method such as a reactive ion etching method, an ICP etching method, an ECR etching method, a parallel plate (capacitively coupled) etching method, a magnetron plasma etching method, a dual-frequency plasma etching method, or a helicon wave plasma etching method.

As the etching (gas, a chlorine-based gas such as chlorine, boron chloride, silicon chloride, boron trichloride, or carbon tetrachloride; a fluorine-based gas such as carbon tetrafluoride, sulfur fluoride, or nitrogen fluoride; oxygen; or the like can be used as appropriate.

Specifically, in this embodiment, since the conductive film 340 in which a titanium film, an aluminum film, and a tungsten film are stacked in this order is used, dry etching is performed changing the conditions of the dry etching on the way of the process, as follows. First, the conditions are set so that the flow rates of chlorine, carbon tetrafluoride, and oxygen in the etching gas are 45 sccm, 55 sccm, and 55 sccm respectively, the reaction pressure is 0.67 Pa, the temperature of the lower electrode is −10° C., the RF (13.56 MHz) power which is supplied to the coil-shaped electrode is 3000 W, and the power which is supplied to the lower electrode (on the bias side) is 140 W. Then, the conditions are set so that the flow rates of chlorine and boron trichloride in the etching gas are 20 sccm and 60 sccm respectively, the reaction pressure is 1.9 Pa, the temperature of the lower electrode is −10° C., the RF (13.56 MHz) power which is supplied to the coil-shaped electrode is 450 W, and the power which is supplied to the lower electrode (on the bias side) is 100 W.

Alternatively, in the case of using the conductive film 340 formed by stacking a titanium film, an aluminum film, and a titanium film in this order, dry etching is performed under such conditions that the flow rates of chlorine and boron trichloride in the etching gas are 20 sccm and 60 sccm respectively, the reaction pressure is 1.9 Pa, the temperature of the lower electrode is −10° C., the RF (13.56 MHz) power which is supplied to the coil-shaped electrode is 450 W, and the power which is supplied to the lower electrode (on the bias side) is 100 W.

After the above-described step, the second substrate 327 is provided to face the first substrate 318, and the liquid crystal layer 328 is provided. Thus, the liquid crystal display device as illustrated in FIG. 2 can be obtained.

Injection of a liquid crystal for forming the liquid crystal layer 328 may be performed by a dispenser method (dripping method) or a dipping method (pumping method).

As the liquid crystal, a thermotropic liquid crystal, a ferroelectric liquid crystal, an anti-ferroelectric liquid crystal, or the like can be used, and either a low-molecular weight liquid crystal and a polymer liquid crystal can be used.

The liquid crystal layer 328 is formed using a liquid crystal material that can be used in horizontal electric field mode, preferably a liquid crystal material exhibiting a blue phase. The liquid crystal material exhibiting a blue phase includes a liquid crystal and a chiral agent. The chiral agent is employed to align the liquid crystal in a helical structure and to make the liquid crystal exhibit a blue phase. For example, a liquid crystal material into which a chiral agent is mixed at 3 wt % or more may be used for the liquid crystal layer.

For the chiral agent, a material which has a high compatibility with a liquid crystal and has a strong twisting power is used. In addition, either an R-enantiomer or an S-enantiomer is favorable as the material, and a racemic body in which an R-enantiomer and an S-enantiomer are mixed at a ratio of 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are found in a liquid crystal material having a cholesteric phase or a smectic phase with a relatively short helical pitch of 500 nm or less. The alignment of the liquid crystal material has a double twist structure. Having the order of less than or equal to an optical wavelength in the visible wavelength range, the liquid crystal material is transparent, and changes the alignment order by voltage application to cause optical modulation action. A blue phase is optically isotropic and thus has no viewing angle dependence. Thus, an alignment film is not necessarily formed; therefore, display image quality can be improved and cost can be reduced.

The blue phase appears only within a narrow temperature range; therefore, it is preferable that a photocurable resin and a photopolymerization initiator be added to a liquid crystal material and polymer stabilization treatment be performed thereon in order to widen the temperature range. The polymer stabilization treatment is performed in such a manner that a liquid crystal material including a liquid crystal, a chiral agent, a photocurable resin, and a photopolymerization initiator is irradiated with light having a wavelength with which the photopolymerization initiator are reacted. This polymer stabilization treatment may be performed by irradiating a liquid crystal material in the state of exhibiting an isotropic phase with light or by irradiating a liquid crystal material in the state of exhibiting a blue phase with light under the control of the temperature.

For example, the polymer stabilization treatment is performed in the following manner: the temperature of a liquid crystal layer is controlled and under the state in which the blue phase is exhibited, the liquid crystal layer is irradiated with light. However, the polymer stabilization treatment is not limited to this manner and may be performed in such a manner that a liquid crystal layer under the state of exhibiting an isotropic phase at a temperature within +10° C., preferably +5° C. of the phase transition temperature between the blue phase and the isotropic phase is irradiated with light. The phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. As an example of the polymer stabilization treatment, the following method can be employed: after heating a liquid crystal layer to exhibit the isotropic phase, the temperature of the liquid crystal layer is gradually decreased so that the phase changes to the blue phase, and then, irradiation with light is performed while the temperature at which the blue phase is exhibited is kept. Alternatively, after the phase changes to the isotropic phase by gradually heating a liquid crystal layer, the liquid crystal layer can be irradiated with light under a temperature within +10° C., preferably +5° C. of the phase transition temperature between the blue phase and the isotropic phase (under the state of exhibiting an isotropic phase). In the case of using an ultraviolet curable resin (a UV curable resin) as the photocurable resin included in the liquid crystal material, the liquid crystal layer may be irradiated with ultraviolet rays. If polymer stabilization treatment is performed by irradiation of light on an isotropic phase that appears under a temperature within +10° C., preferably +5° C. of the phase transition temperature between the blue phase and the isotropic phase, the response time can be made as short as 1 msec or less and high-speed response is possible.

The photocurable resin may be a polyfunctional monomer such as diacrylate, triacrylate, dimethacrylate, or trimethacrylate; or a mixture with a monofunctional monomer. Further, the photocurable resin may be a resin having a liquid crystallinity, a resin having a non-liquid crystallinity, or a mixture of them.

As the photopolymerization initiator, a radical polymerization initiator which generates radicals by light irradiation, an acid generator which generates an acid by light irradiation, or a base generator which generates a base by light irradiation may be used.

Specifically, a mixture of JC-1041XX (produced by Chisso Corporation) and 4-cyano-4'-pentylbiphenyl can be used as the liquid crystal material. ZLI-4572 (produced by Merck Ltd., Japan) can be used as the chiral agent. As the photocurable resin, 2-ethylhexyl acrylate, RM257 (produced by Merck Ltd., Japan), or trimethylolpropane triacrylate can be used. As the photopolymerization initiator, 2,2-dimethoxy-2-phenylacetophenone can be used.

A color filter that selectively transmits light in a specific wavelength region may be provided over the second substrate 327.

In a traditional structure, a scan line and a signal line, which respectively correspond to the first wiring and the second wiring, intersect with each other with only an insulating film 320 interposed therebetween. Since the insulating film 320 functions as a gate insulating film, there is a limitation on its thickness. In contrast, in the aforementioned structure, the second wiring is separated from the second wirings in other pixels, and the separated second wirings are connected with the first connection electrode positioned over the insulating film 323, which allows the scan line and the signal line to intersect with each other with the insulating films 320 to 323 interposed therebetween. Therefore, since the thickness of an insulating layer which insulates the scan line from the signal line can be increased in the intersection portion, parasitic capacitance generated in the intersection portion can be reduced, which contributes to the suppression of a decrease in driving speed in the liquid crystal display device even when the number of pixels is increased. By using a low-resistance metal as a material of the first connection electrode and making the thickness of the first connection electrode large, wiring resistance can be reduced; accordingly, a decrease in driving speed of the liquid crystal display device can be suppressed. Accordingly, a high-quality moving image can be provided. By making thickness of the first electrode layer functioning as a pixel electrode and the second electrode layer functioning as a common electrode large, surface areas of the first electrode layer and the second electrode layer can be expanded in the film thickness direction of the liquid crystal layer (three-dimensionally). This enables an electric field to be applied in a large region of the liquid crystal layer at the time of voltage application between the first electrode layer and the second electrode layer and also enables liquid crystal molecules to be controlled with the use of the electric field. Accordingly, in a liquid crystal display device with horizontal electric field mode, particularly in a liquid crystal display device in which a liquid crystal exhibiting a blue phase is used, the contrast ratio can be increased by increasing white transmittance. Further, since the first electrode layer functioning as a pixel electrode, the second electrode layer functioning as a common electrode, and the first connection electrode can be formed in the same layer at the same time, the process can be simplified.

The structure and the like in this embodiment can be combined with any of the structures and the like in the other embodiments as appropriate.

Embodiment 2

In this embodiment, a liquid crystal display device according to another embodiment of the present invention and a method for manufacturing the liquid crystal display device will be described with reference to FIG. 6, FIG. 7, and FIGS. 8A to 8C.

Figure 6:
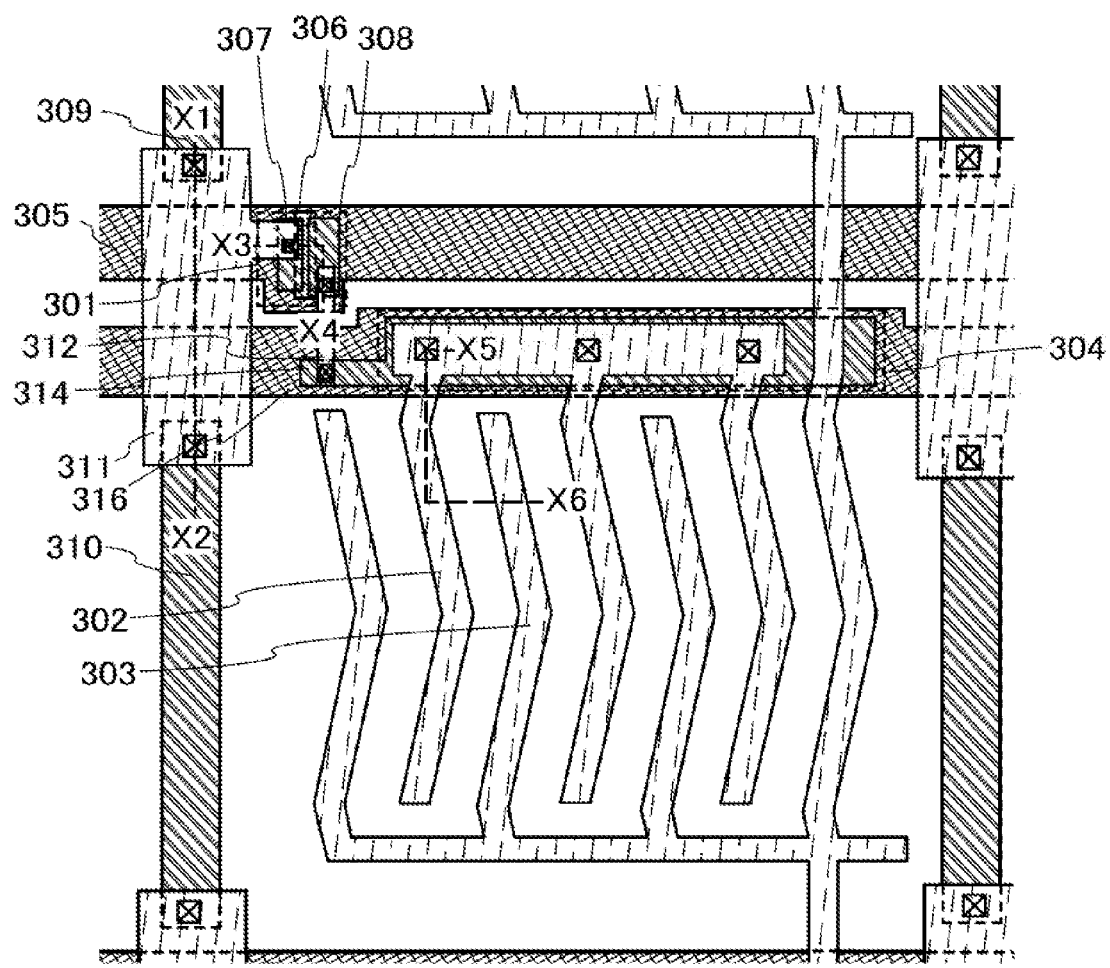
FIG. 6 is a top view of a pixel of a liquid crystal display device according to an embodiment of the present invention.
Figure 7:
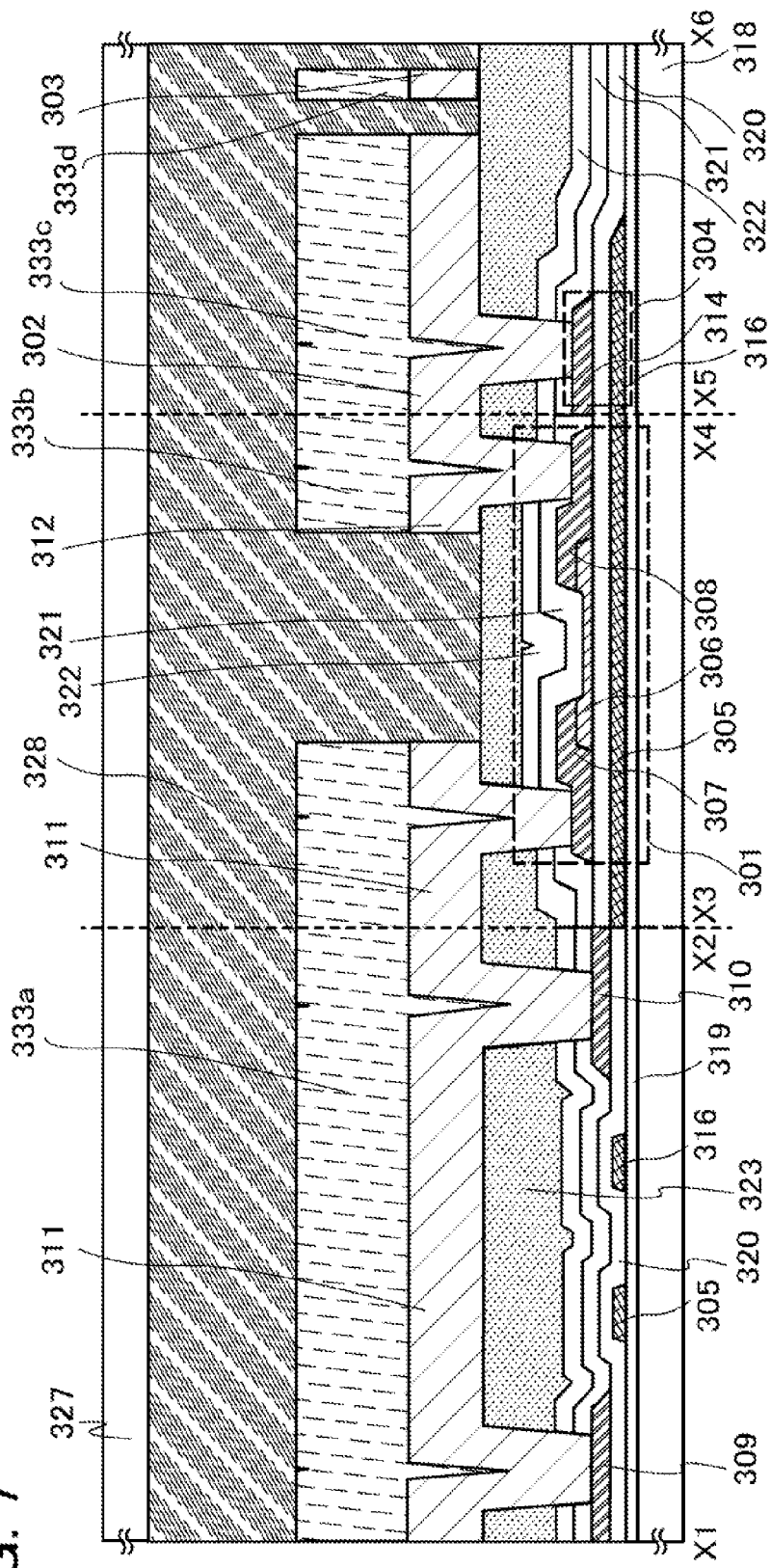
FIG. 7 is a cross-sectional view of a pixel of a liquid crystal display device according to an embodiment of the present invention.
Figure 8A:
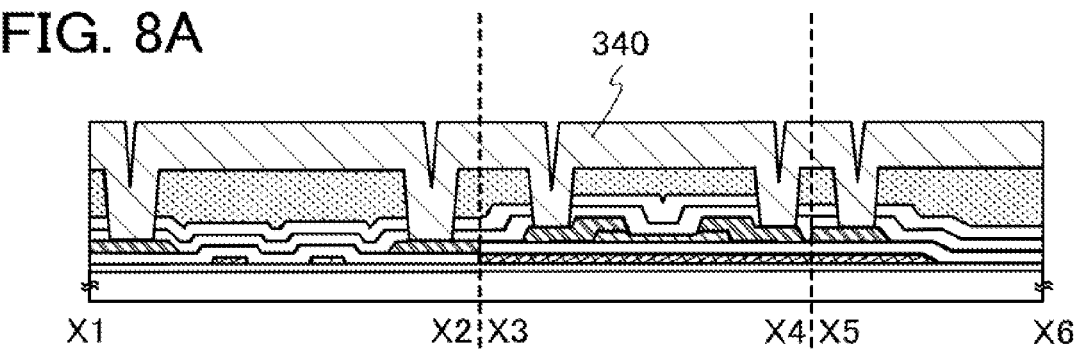
FIGS. 8A to 8C illustrate a method for manufacturing a pixel of a liquid crystal display device according to an embodiment of the present invention.
Figure 8B:
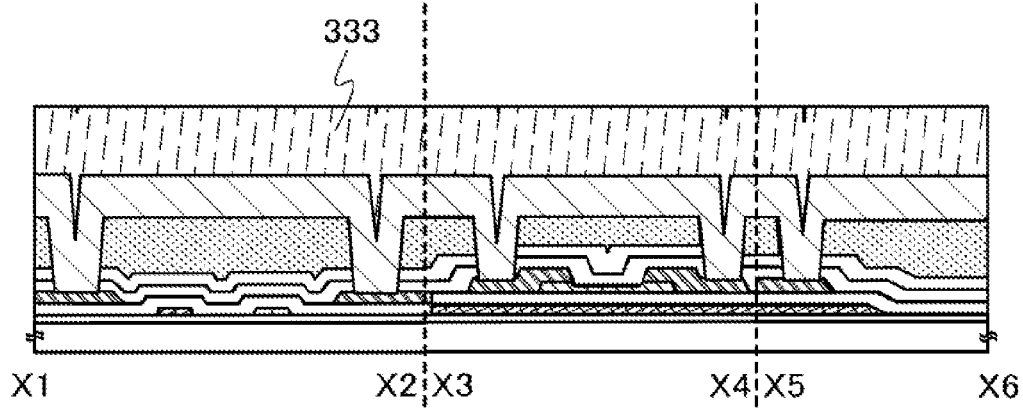
Figure 8C:
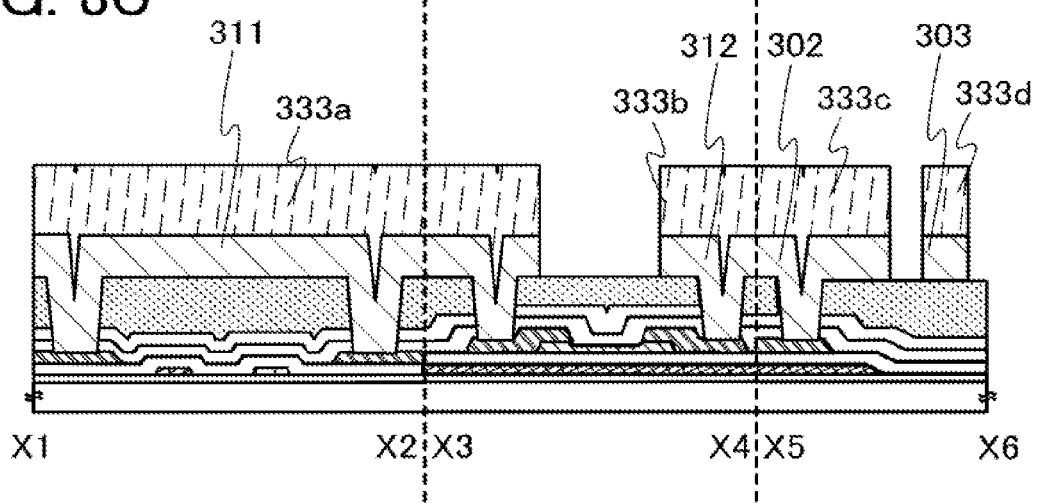

A pixel region in a liquid crystal display device according to an embodiment of the present invention includes a plurality of first wirings, a plurality of second wirings, a plurality of transistors, and a first substrate and a second substrate between which a liquid crystal layer is interposed. A structure of part of the pixel region of the liquid crystal display device according to an embodiment of the present invention will be described. FIG. 6 is a plan view of the liquid crystal display device and illustrates one pixel. In the liquid crystal display device described in this embodiment, a plurality of such pixels is provided in matrix. FIG. 7 is a cross-sectional view taken along line X1-X2, line X3-X4, line X5-X6 in FIG. 6. FIGS. 8A to 8C illustrate a manufacturing method of the liquid crystal display device according to an embodiment of the present invention.

Specific structures of components of the liquid crystal display device in this embodiment will be described below.

One pixel in the active-matrix liquid crystal display device including a transistor illustrated in FIG. 6 and FIG. 7 includes a transistor 301, a first electrode layer 302 functioning as a pixel electrode layer, a second electrode layer 303 functioning as a common electrode layer, and a capacitor 304.

A structure of the transistor 301 will be described. The transistor 301 includes, over a first substrate 318, an insulating film 319, a first wiring 305 over the insulating film 319, an insulating film 320 functioning as a gate insulating film over the first wiring 305, a semiconductor layer 306 formed in a position overlapping with the first wiring 305 with the insulating film 320 interposed therebetween, a source electrode 307 and a drain electrode 308 over the insulating film 320 and the semiconductor layer 306, an insulating film 321 over the semiconductor layer 306, the source electrode 307, and the drain electrode 308, and an insulating film 322 over the insulating film 321.

The above embodiment can be referred to for the structure of the transistor 301.

The above embodiment can be referred to also for the first electrode layer 302, the second electrode layer 303, the first connection electrode 311, the second connection electrode 312, the first wiring 305, the second wiring 309, the second wiring 310, the third wiring 316, and the conductive film 314.

The liquid crystal display device in this embodiment is different from the liquid crystal display device in Embodiment 1 in including an insulating film 333a, an insulating film 333b, an insulating film 333c, and an insulating film 333d provided over and in contact with the first connection electrode 311, the second connection electrode 312, the first electrode layer 302, and the second electrode layer 303.

The insulating film 333a, the insulating film 3.33b, the insulating film 333c, and the insulating film 333d absorb light reflected from the first connection electrode 311, the second connection electrode 312, the first electrode layer 302, and the second electrode layer 303. The absorption of light can suppress reflection of light by metal layers such as the first connection electrode 311, the second connection electrode 312, the first electrode layer 302, and the second electrode layer 303, preventing color mixture between adjacent pixels.

The insulating films 333a to 333d can be formed using carbon black or an organic resin including a black pigment.

The insulating film 333a, the insulating film 333b, the insulating film 333c, and the insulating film 333d have a function of preventing disclination caused by disorder of liquid crystal alignment between pixels from being perceived or preventing diffusing light from entering a plurality of adjacent pixels.

In the case of providing the insulating film 333a, the insulating film 333b, the insulating film 333c, and the insulating film 333d, depths of depressions on top surfaces of the insulating film 333a, the insulating film 333b, the insulating film 333c, and the insulating film 333d are smaller than depths of depressions on top surfaces of the first connection electrode 311, the second connection electrode 312, the first electrode layer 302, and the second electrode layer 303. As a result, disorder of liquid crystal alignment of the liquid crystal layer 328 formed later can be reduced; accordingly, the alignment state of the liquid crystal layer 328 can be controlled.

Next, a method for manufacturing a liquid crystal display device according to an embodiment of the present invention will be described with reference to FIGS. 8A to 8C.

The structure illustrated in FIG. 8A can be formed in a manner similar to that of the structure illustrated in FIG. 5A in the above embodiment. After the conductive film 340 is formed, the insulating film 333 is formed in contact with the conductive film 340 as illustrated in FIG. 8B.

Next, the conductive film 340 and the insulating film 333 are processed by dry etching, so that as illustrated in FIG. 8C, the first connection electrode 311, the second connection electrode 312, the first electrode layer 302, and the second electrode layer 303 each having an island shape are formed and the insulating film 333a, the insulating film 333b, the insulating film 333c, and the insulating film 333d provided in contact with the first connection electrode 311, the second connection electrode 312, the first electrode layer 302, and the second electrode layer 303 are formed. By processing the conductive film 340 and the insulating film 333 in the same step, only one mask is necessary for processing the conductive film 340 and processing the insulating film 333; thus, the number of necessary masks can be reduced.

After the above-described step, the second substrate 327 is provided to face the first substrate 318, and the liquid crystal layer 328 is provided. Thus, the liquid crystal display device as illustrated in FIG. 7 can be obtained.

Next, referring to FIGS. 9A to 9D, cross-sectional shapes of the insulating film 333a, the insulating film 333b, the insulating film 333c, the insulating film 333d, the first connection electrode 311, the second connection electrode 312, the first electrode layer 302, and the second electrode layer 303 will be described. Here, as an example, the cross-sectional shapes of the insulating film 333c, the insulating film 333d, the first electrode layer 302, and the second electrode layer 303 will be described.

Figure 9A:
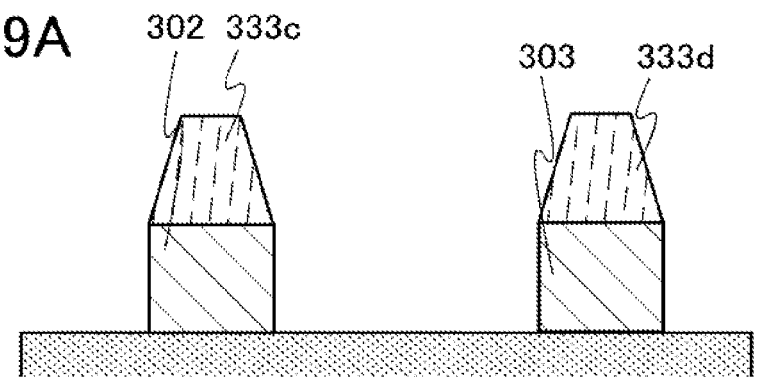
FIGS. 9A to 9D illustrate shapes of electrodes of a liquid crystal display device according to an embodiment of the present invention.
Figure 9B:
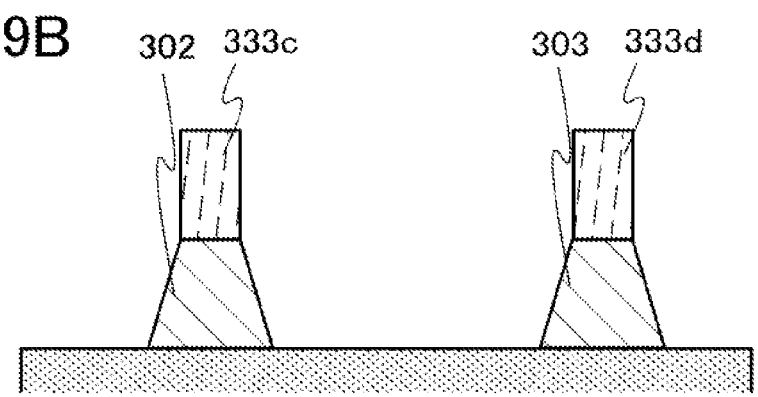
Figure 9C:
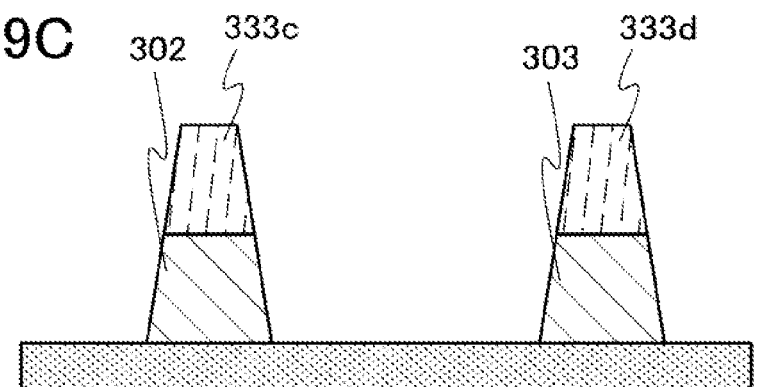
Figure 9D:
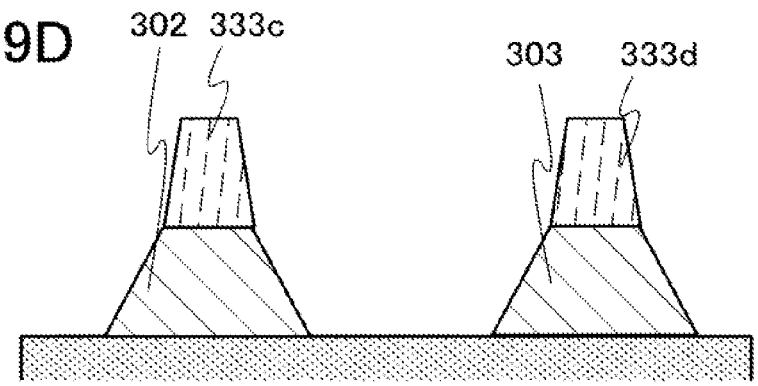

As illustrated in FIG. 9A, the insulating film 333c and the insulating film 333d may have a so-called tapered shape, in which side surfaces are inclined with respect to the first substrate 318. As illustrated in FIG. 9B, the first electrode layer 302 and the second electrode layer 303 may have a tapered shape. Further, as illustrated in FIG. 9C, taper angles of the insulating film 333c and the insulating film 333d may be the same as taper angles of the first electrode layer 302 and the second electrode layer 303 to form continuous tapered shapes. Furthermore, as illustrated in FIG. 9D, taper angles of the insulating film 333c and the insulating film 333d may be different from taper angles of the first electrode layer 302 and the second electrode layer 303.

That is, any structure which enables the top surfaces of the first electrode layer 302 and the second electrode layer 303 to be covered with the insulating film 333c and the insulating film 333d can be used.

In a traditional structure, a scan line and a signal line, which respectively correspond to the first wiring and the second wiring, intersect with each other with only an insulating film 320 interposed therebetween. Since the insulating film 320 functions as a gate insulating film, there is a limitation on its thickness. In contrast, in the aforementioned structure, the second wiring is separated from the second wirings in other pixels, and the separated second wirings are connected with the first connection electrode positioned over the insulating film 323, which allows the scan line and the signal line to intersect with each other with the insulating films 320 to 323 interposed therebetween. Therefore, since the thickness of an insulating layer which insulates the scan line from the signal line can be increased in the intersection portion, parasitic capacitance generated in the intersection portion can be reduced, which contributes to the suppression of a decrease in driving speed in the liquid crystal display device even when the number of pixels is increased. By using a low-resistance metal as a material of the first connection electrode and making the thickness of the first connection electrode large, wiring resistance can be reduced; accordingly, a decrease in driving speed of the liquid crystal display device can be suppressed. Accordingly, a high-quality moving image can be provided. By making thicknesses of the first electrode layer functioning as a pixel electrode and the second electrode layer functioning as a common electrode large, surface areas of the first electrode layer and the second electrode layer can be expanded in the film thickness direction of the liquid crystal layer (three-dimensionally). This enables an electric field to be generated in a large region of the liquid crystal layer at the time of voltage application between the first electrode layer and the second electrode layer and also enables liquid crystal molecules to be controlled with the use of the electric field. Accordingly, in a liquid crystal display device with horizontal electric field mode, particularly in a liquid crystal display device in which a liquid crystal exhibiting a blue phase is used, the contrast ratio can be increased by increasing white transmittance. Further, since the first electrode layer functioning as a pixel electrode, the second electrode layer functioning as a common electrode, and the first connection electrode can be formed in the same layer at the same time, the process can be simplified. Since the insulating films having a light-shielding property can absorb light reflected from the metal layers such as the first electrode layer and the second electrode layer and suppress reflection of light by the metal layers, color mixture between adjacent pixels can be prevented.

The structure and the like in this embodiment can be combined with any of the structures and the like in the other embodiments as appropriate.

Embodiment 3

Figure 10:
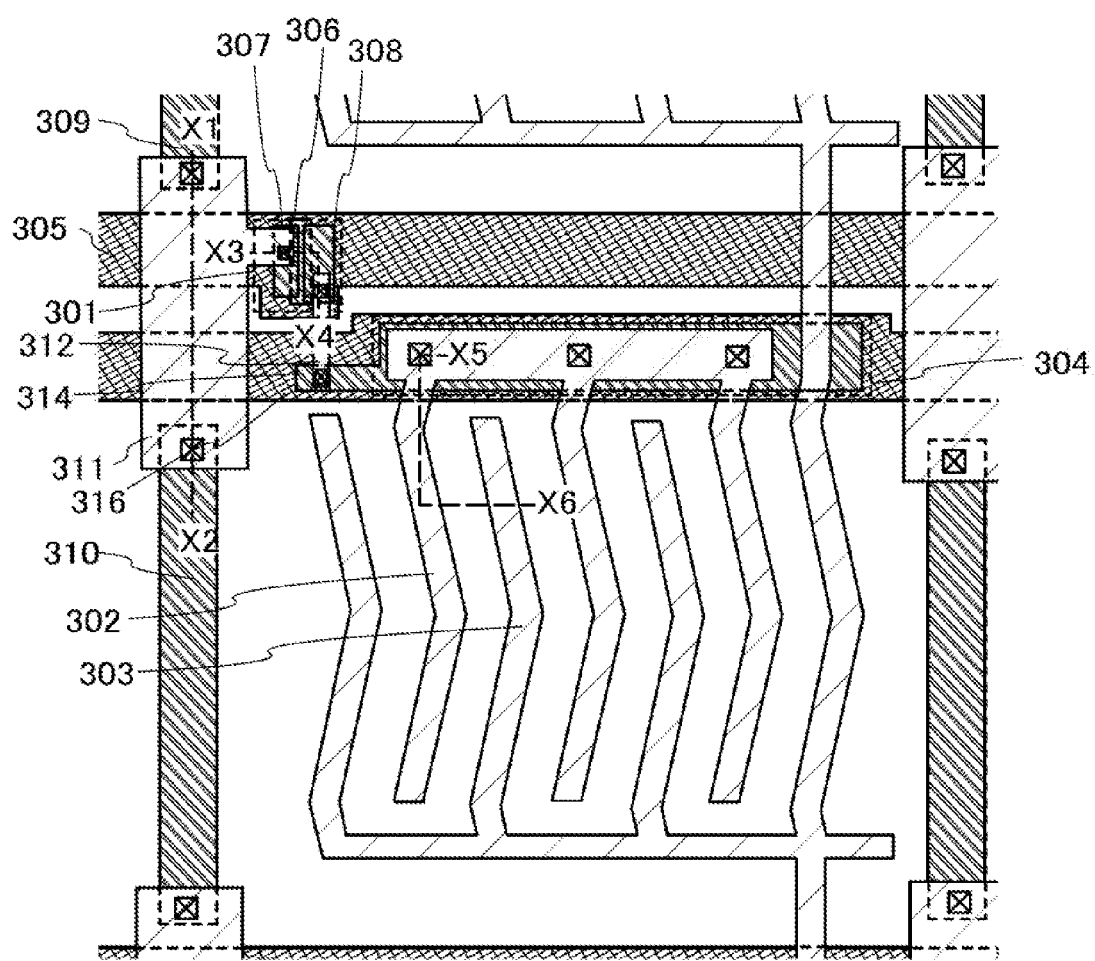
FIG. 10 is a top view of a pixel of a liquid crystal display device according to an embodiment of the present invention.
Figure 11:
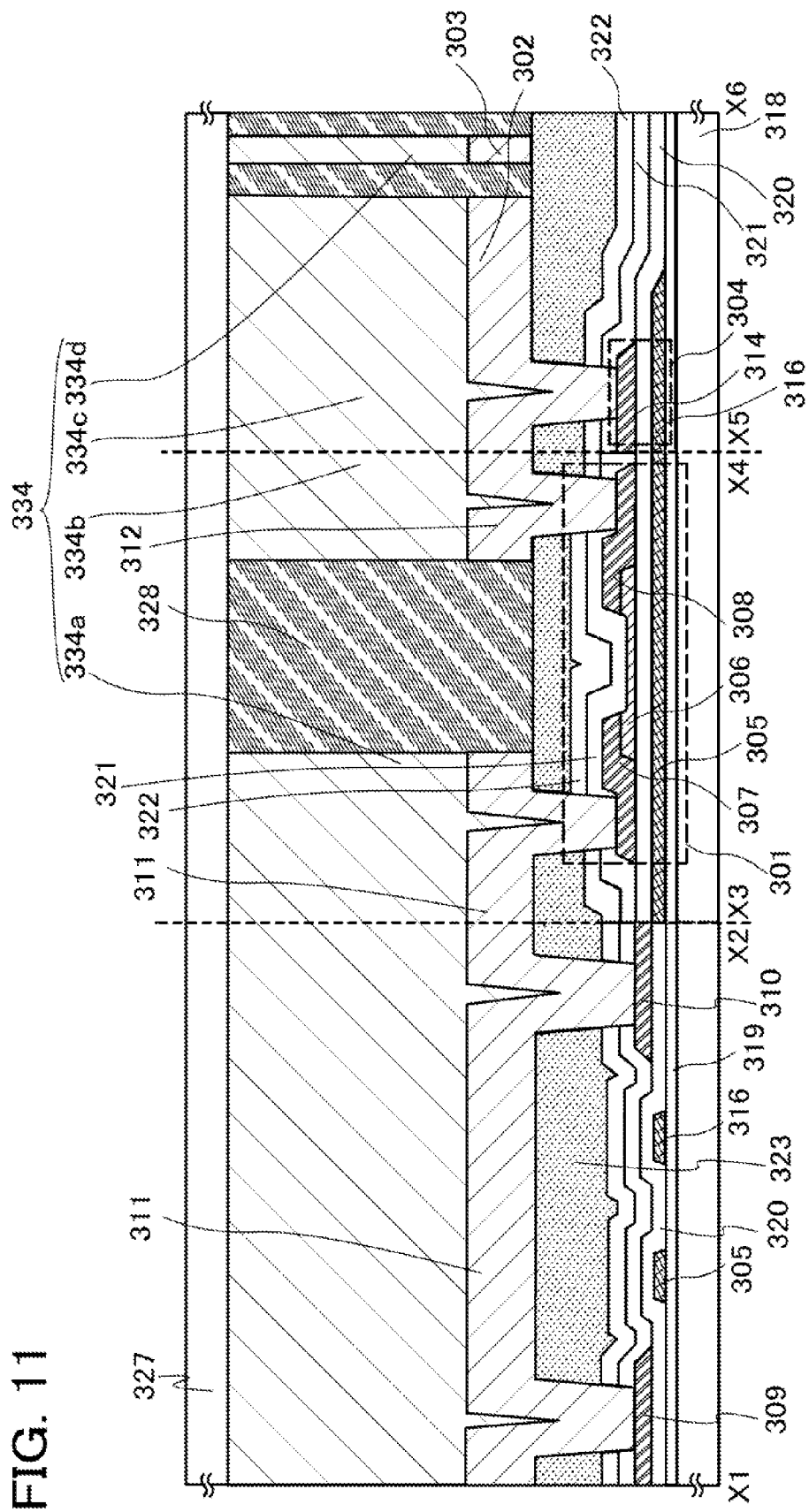
FIG. 11 is a cross-sectional view of a pixel of a liquid crystal display device according to an embodiment of the present invention.

A pixel region in a liquid crystal display device according to another embodiment of the present invention includes a plurality of first wirings, a plurality of second wirings, a plurality of transistors, and a first substrate and a second substrate between which a liquid crystal layer is interposed. A structure of part of the pixel region of the liquid crystal display device according to an embodiment of the present invention will be described. FIG. 10 is a plan view of the liquid crystal display device and illustrates one pixel. In the liquid crystal display device described in this embodiment, a plurality of such pixels is provided in matrix. FIG. 11 is a cross-sectional view taken along line X1-X2, line X3-X4, line X5-X6 in FIG. 10.

Specific structures of components of the liquid crystal display device in this embodiment will be described below.

One pixel in the active-matrix liquid crystal display device including a transistor illustrated in FIG. 10 and FIG. 11 includes a transistor 301, a first electrode layer 302 functioning as a pixel electrode layer, a second electrode layer 303 functioning as a common electrode layer, and a capacitor 304.

A structure of the transistor 301 will be described. The transistor 301 includes, over a first substrate 318, an insulating film 319, a first wiring 305 over the insulating film 319, an insulating film 320 functioning as a gate insulating film over the first wiring 305, a semiconductor layer 306 formed in a position overlapping with the first wiring 305 with the insulating film 320 interposed therebetween, a source electrode 307 and a drain electrode 308 over the insulating film 320 and the semiconductor layer 306, an insulating film 321 over the semiconductor layer 306, the source electrode 307, and the drain electrode 308, and an insulating film 322 over the insulating film 321.

The above embodiments can be referred to for the structure of the transistor 301.

The above embodiments can be referred to also for the first electrode layer 302, the second electrode layer 303, the first connection electrode 311, the second connection electrode 312, the first wiring 305, the second wiring 309, the second wiring 310, the third wiring 316, and the conductive film 314.

The liquid crystal display device in this embodiment is different from the liquid crystal display device in Embodiment 1 in including an insulating film 334a, an insulating film 334b, an insulating film 334c, and an insulating film 334d which are provided over and in contact with the first connection electrode 311, the second connection electrode 312, the first electrode layer 302, and the second electrode layer 303 and also in contact with the second substrate 327.

As illustrated in FIG. 11, by having a structure in contact with the second substrate 327, the insulating film 334a, the insulating film 334b, the insulating film 334c, and the insulating film 334d provided in contact with the first connection electrode 311, the second connection electrode 312, the first electrode layer 302, and the second electrode layer 303 function as spacers that adjust the cell gap of the liquid crystal element.

A method for manufacturing the liquid crystal display device according to an embodiment of the present invention will be described.

An insulating film 334 is formed over and in contact with the conductive film 340 in a manner similar to that illustrated in FIG. 8B in the above embodiment.

Next, in a manner similar to that of the above embodiment, the conductive film 340 and the insulating film 334 are processed by dry etching, so that the first connection electrode 311, the second connection electrode 312, the first electrode layer 302, and the second electrode layer 303 each having an island shape are formed and the insulating film 334a, the insulating film 334b, the insulating film 334c, and the insulating film 334d provided in contact with the first connection electrode 311, the second connection electrode 312, the first electrode layer 302, and the second electrode layer 303 are formed. By processing the conductive film 340 and the insulating film 334 in the same step, only one mask is necessary for processing the conductive film 340 and processing the insulating film 334; thus, the number of necessary masks can be reduced.

For the insulating film 334, an acrylic resin or the like can be used, for example.

After the above-described step, the second substrate 327 is provided to face the first substrate 318 and to be in contact with the insulating film 334a, the insulating film 334b, the insulating film 334c, and the insulating film 334d, and the liquid crystal layer 328 is provided. Thus, the liquid crystal display device as illustrated in FIG. 10 can be obtained.

Instead of the insulating film 334, the insulating films 333a to 333d having a light-shielding property as in Embodiment 2 can be used so that the insulating films 333a to 333d are in contact with the second substrate 327 in addition to the first connection electrode 311, the second connection electrode 312, the first electrode layer 302, and the second electrode layer 303.

The insulating film 333a, the insulating film 333b, the insulating film 333c, and the insulating film 333d absorb light reflected from the first connection electrode 311, the second connection electrode 312, the first electrode layer 302, and the second electrode layer 303. The absorption of light can suppress reflection of light by metal layers such as the first connection electrode 311, the second connection electrode 312, the first electrode layer 302, and the second electrode layer 303, preventing color mixture between adjacent pixels.

By using the insulating film 333 having a light-shielding property, disclination caused by disorder of liquid crystal alignment between pixels can be prevented from being perceived or diffusing light can be prevented from entering a plurality of adjacent pixels.

In a traditional structure, a scan line and a signal line, which respectively correspond to the first wiring and the second wiring, intersect with each other with only an insulating film 320 interposed therebetween. Since the insulating film 320 functions as a gate insulating film, there is a limitation on its thickness. In contrast, in the aforementioned structure, the second wiring is separated from the second wirings in other pixels, and the separated second wirings are connected with the first connection electrode positioned over the insulating film 323, which allows the scan line and the signal line to intersect with each other with the insulating films 320 to 323 interposed therebetween. Therefore, since the thickness of an insulating layer which insulates the scan line from the signal line can be increased in the intersection portion, parasitic capacitance generated in the intersection portion can be reduced, which contributes to the suppression of a decrease in driving speed in the liquid crystal display device even when the number of pixels is increased. By using a low-resistance metal as a material of the first connection electrode and making the thickness of the first connection electrode large, wiring resistance can be reduced; accordingly, a decrease in driving speed of the liquid crystal display device can be suppressed. Accordingly, a high-quality moving image can be provided. By making thicknesses of the first electrode layer functioning as a pixel electrode and the second electrode layer functioning as a common electrode large, surface areas of the first electrode layer and the second electrode layer can be expanded in the film thickness direction of the liquid crystal layer (three-dimensionally). This enables an electric field to be generated in a large region of the liquid crystal layer at the time of voltage application between the first electrode layer and the second electrode layer and also enables liquid crystal molecules to be controlled with the use of the electric field. Accordingly, in a liquid crystal display device with horizontal electric field mode, particularly in a liquid crystal display device in which a liquid crystal exhibiting a blue phase is used, the contrast ratio can be increased by increasing white transmittance. Further, since the first electrode layer functioning as a pixel electrode, the second electrode layer functioning as a common electrode, and the first connection electrode can be formed in the same layer at the same time, the process can be simplified. In addition, the insulating films can adjust the cell gap of the liquid crystal element by being in contact with the second substrate.

The structure and the like in this embodiment can be combined with any of the structures and the like in the other embodiments as appropriate.

Embodiment 4

A transistor in a liquid crystal display device according to an embodiment of the present invention may have any structure as long as the structure does not depart from the spirit and the scope of the present invention. However, it is particularly preferable to use a transistor in which microcrystalline silicon is used in a semiconductor layer. In this embodiment, a liquid crystal display device according to an embodiment of the present invention which includes a transistor in which microcrystalline silicon is used in a semiconductor layer will be described with reference to FIG. 12 and FIG. 13.

Figure 12:
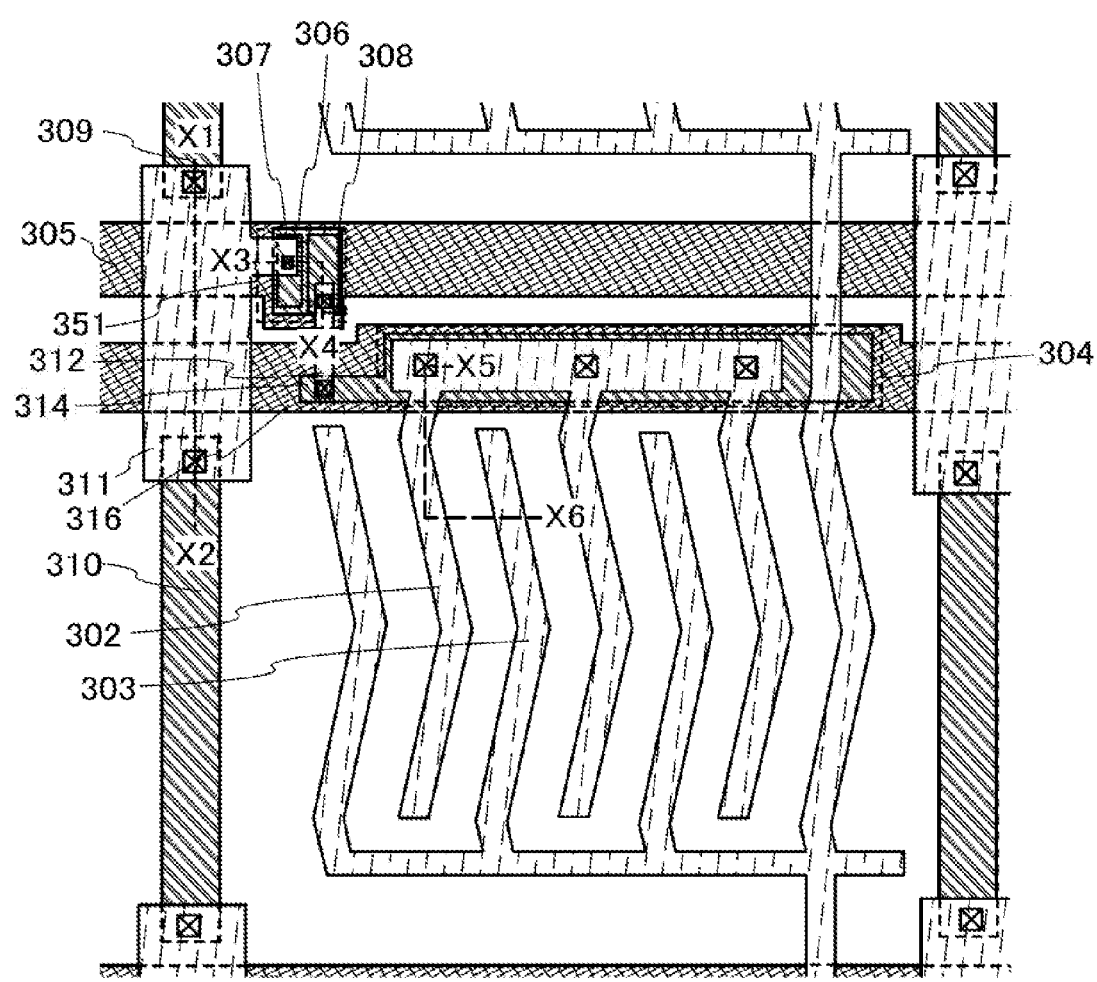
FIG. 12 is a top view of a pixel of a liquid crystal display device according to an embodiment of the present invention.
Figure 13:
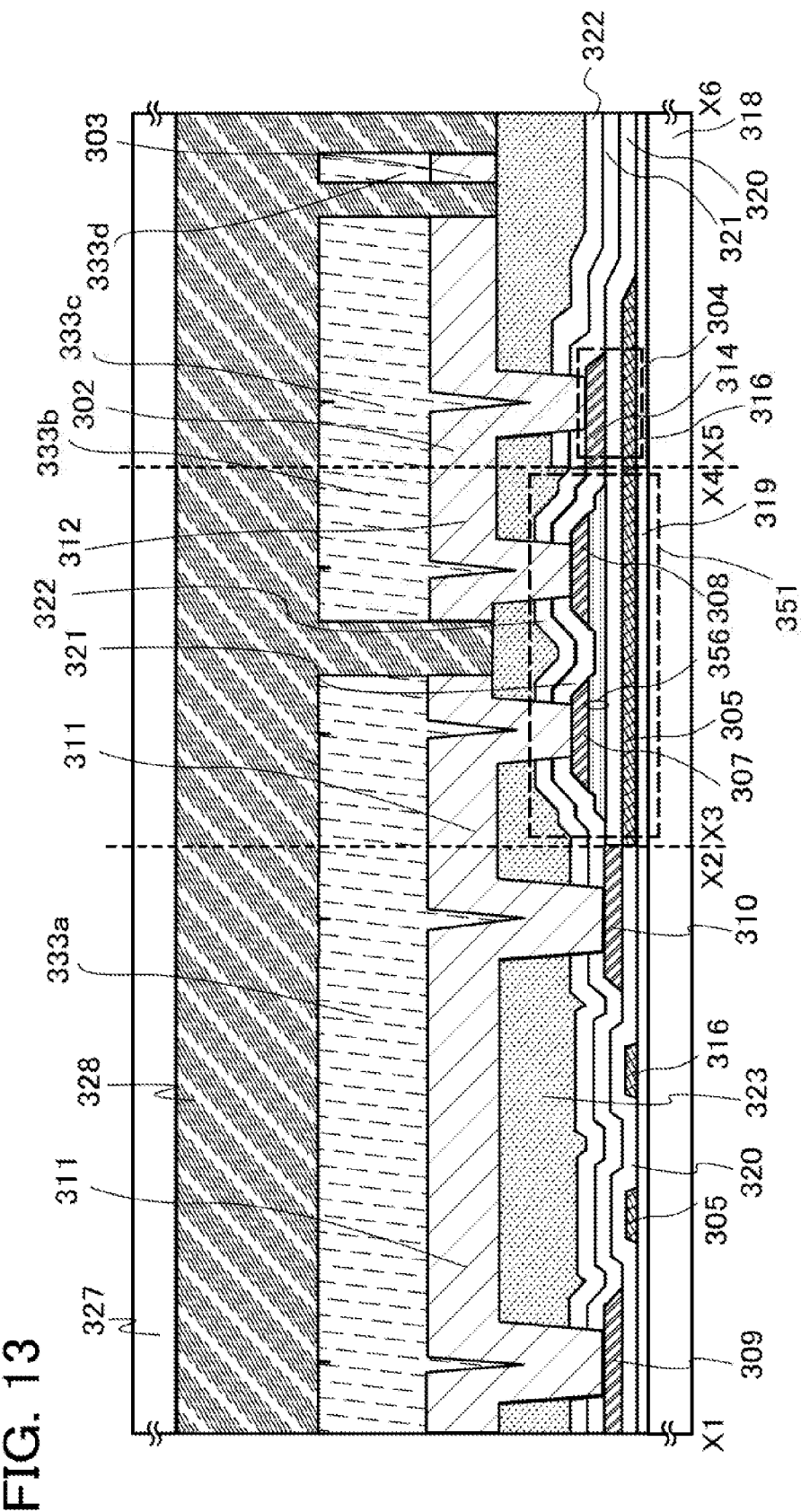
FIG. 13 is a cross-sectional view of a pixel of a liquid crystal display device according to an embodiment of the present invention.

A pixel region in a liquid crystal display device according to an embodiment of the present invention includes a plurality of first wirings, a plurality of second wirings, a plurality of transistors, and a first substrate and a second substrate between which a liquid crystal layer is interposed. A structure of part of the pixel region of the liquid crystal display device according to an embodiment of the present invention will be described. FIG. 12 is a plan view of the liquid crystal display device and illustrates one pixel. In the liquid crystal display device described in this embodiment, a plurality of such pixels is provided in matrix. FIG. 13 is a cross-sectional view taken along line X1-X2, line X3-X4, line X5-X6 in FIG. 12.

Specific structures of components of the liquid crystal display device in this embodiment will be described below.

One pixel in the active-matrix liquid crystal display device including a transistor illustrated in FIG. 12 and FIG. 13 includes a transistor 351, a first electrode layer 302 functioning as a pixel electrode layer, a second electrode layer 303 functioning as a common electrode layer, and a capacitor 304.

A structure of the transistor 351 will be described. The transistor 351 includes, over a first substrate 318, an insulating film 319, a first wiring 305 over the insulating film 319, an insulating film 320 functioning as a gate insulating film over the first wiring 305, a semiconductor layer 356 formed in a position overlapping with the first wiring 305 with the insulating film 320 interposed therebetween, a source electrode 307 and a drain electrode 308 over the insulating film 320 and the semiconductor layer 356, an insulating film 321 over the semiconductor layer 356, the source electrode 307, and the drain electrode 308, and an insulating film 322 over the insulating film 321.

The above embodiments can be referred to for the structure of the transistor 351 except for the structure of the semiconductor layer 356.

The above embodiments can be referred to also for the first electrode layer 302, the second electrode layer 303, the first connection electrode 311, the second connection electrode 312, the first wiring 305, the second wiring 309, the second wiring 310, the third wiring 316, and the conductive film 314.

The liquid crystal display device in this embodiment is different from the liquid crystal display device in Embodiment 2 in that the transistor 351 in the liquid crystal display device in this embodiment is a transistor in which microcrystalline silicon is used in a semiconductor layer.

The liquid crystal display device illustrated in FIG. 13 includes the transistor 351 in which microcrystalline silicon is used in a semiconductor layer. The transistor 351 includes the first wiring 305 functioning as a gate electrode, the semiconductor layer 356 formed in a position overlapping with the first wiring 305 with the insulating film 320 interposed therebetween, and the source electrode 307 and the drain electrode 308 over the semiconductor layer 356. Since the components except for the transistor 351 are similar to those of the above embodiment, the above embodiment can be referred to for those components.

The semiconductor layer 356 can be formed by forming a semiconductor film over the insulating film 320 and processing the semiconductor film into a desired shape by etching or the like.

Figure 14:
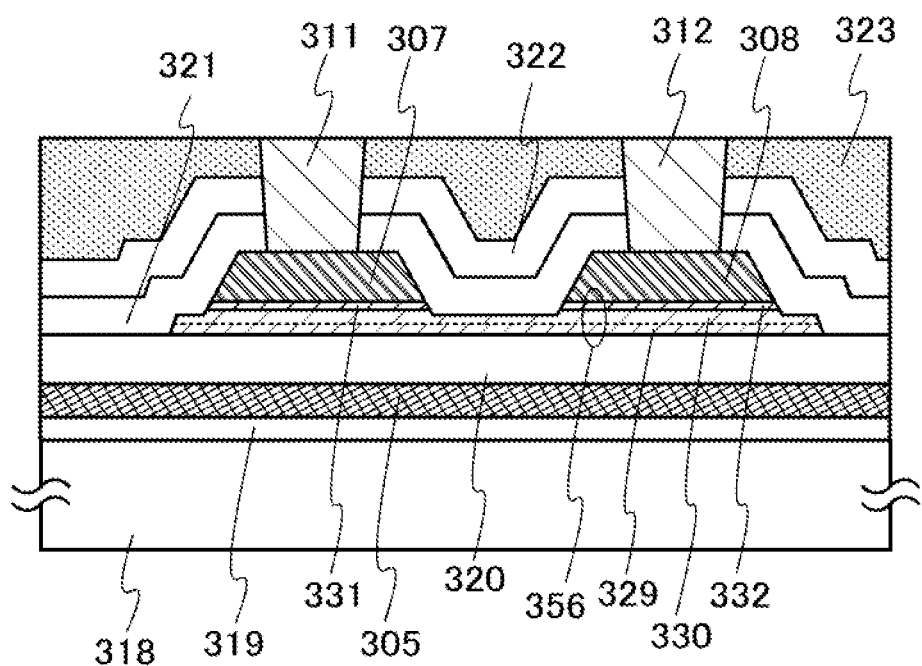
FIG. 14 is a cross-sectional view of a transistor.

An enlarged cross section of the transistor 351 of FIG. 13 is illustrated in FIG. 14. As illustrated in FIG. 14, the semiconductor layer 356 included in the transistor 351 includes a microcrystalline semiconductor layer 329, an amorphous semiconductor layer 330 over the microcrystalline semiconductor layer 329, and impurity semiconductor layers 331 and 332 functioning as source and drain regions over the amorphous semiconductor layer 330. The impurity semiconductor layer 331 is located between the amorphous semiconductor layer 330 and the source electrode 307, and the impurity semiconductor layer 332 is located between the amorphous semiconductor layer 330 and the drain electrode 308.

FIG. 14 illustrates a case in which one amorphous semiconductor layer 330 is provided between the microcrystalline semiconductor layer 329 and the impurity semiconductor layer 331 and between the microcrystalline semiconductor layer 329 and the impurity semiconductor layer 332, as an example. In an embodiment of the present invention, the semiconductor layer may have such a structure that a pair of amorphous semiconductor layers is provided over a microcrystalline semiconductor layer, one impurity semiconductor layer is provided over one of the pair of amorphous semiconductor layers, and another impurity semiconductor layer is provided over the other amorphous semiconductor layer.

The microcrystalline semiconductor layer 329 includes a microcrystalline semiconductor. The microcrystalline semiconductor is a semiconductor having an intermediate structure between an amorphous structure and a crystalline structure (including a single crystal structure and a polycrystalline structure). The microcrystalline semiconductor is a semiconductor having a state which is thermodynamically stable, having short-range order to medium-range order, and includes a crystal grain boundary, a twin crystal boundary, dislocation, and lattice distortion. In the microcrystalline silicon, columnar, needle-like, or inverted conical or pyramidal crystals having a grain size of 2 nm to 200 nm, preferably 10 nm to 80 nm, further preferably 20 nm to 50 nm grow in a direction normal to the substrate surface or the base film surface. Other characteristic points are described above.

By setting the thickness of the microcrystalline semiconductor layer 329, that is, the distance from the interface between the microcrystalline semiconductor layer 329 and the insulating film 320 to the tip of the projection of the microcrystalline semiconductor layer 329 to from 3 nm to 410 nm, preferably from 20 nm to 100 nm, the off-state current of the thin film transistor can be reduced.

Further, it is preferable that the oxygen concentration and the nitrogen concentration in the microcrystalline semiconductor layer 329 which are measured by secondary ion mass spectrometry be less than $1 \times 10^{18}$ atoms/cm$^3$, because such an oxygen concentration and nitrogen concentration can increase the crystallinity of the microcrystalline semiconductor layer 329.

The amorphous semiconductor layer 330 includes an amorphous semiconductor containing nitrogen. Nitrogen in the amorphous semiconductor layer 330 may exist, for example, as an NH group or an NH$_2$ group. Amorphous silicon can be used as an amorphous semiconductor.

The amorphous semiconductor containing nitrogen is a semiconductor having lower energy at an Urbach edge measured by a constant photocurrent method (CPM) or photoluminescence spectroscopy, and an absorption originating from defective levels is weak as compared to a conventional amorphous semiconductor. In other words, as compared to the conventional amorphous semiconductor, the amorphous semiconductor containing nitrogen is a well-ordered amorphous semiconductor having fewer defects and a steep tail of an absorption attributed to a band edge level in the valence band.

In the case where the transistor 351 is an n-channel transistor, the impurity semiconductor layers 331 and 332 are formed of amorphous silicon to which phosphorus is added, microcrystalline silicon to which phosphorus is added, or the like. Alternatively, the impurity semiconductor layers 331 and 332 can have a stacked structure of amorphous silicon to which phosphorus is added and microcrystalline silicon to which phosphorus is added. In the case where the transistor 351 is a p-channel transistor, the impurity semiconductor layers 331 and 332 are formed of amorphous silicon to which boron is added, microcrystalline silicon to which boron is added, or the like. Note that in the case where the semiconductor layer 356 and the source electrode 307 and the drain electrode 308 form an ohmic contact, the semiconductor layer 356 does not necessarily include the impurity semiconductor layers 331 and 332.

In an embodiment of the present invention, the source electrode 307 and the drain electrode 308 are distant from a side surface of the semiconductor layer 356. In other words, in an embodiment of the present invention, the source electrode 307 and the drain electrode 308 are not in contact with the side surface of the microcrystalline semiconductor layer 329 included in the semiconductor layer 356. A leak current readily flows from the source electrode 307 and the drain electrode 308 to the side surface of the semiconductor layer 356. Therefore, this structure allows the reduction in an off-state current of the transistor 351, and leakage of electric charge can be prevented, resulting in improved display quality.

Then, the conductive film 340 is formed over the insulating film 323, the insulating film 333 having a light-shielding property is formed over the conductive film 340, and the conductive film and the insulating film are processed into desired shaped by etching or the like in the same step. In this manner, as illustrated in FIG. 13, the first connection electrode 311, the second connection electrode 312, the first electrode layer 302 functioning as a pixel electrode, and the second electrode layer 303 functioning as a common electrode are formed and the insulating film 333a, the insulating film 333b, the insulating film 333c, and the insulating film 333d provided in contact with the first connection electrode 311, the second connection electrode 312, the first electrode layer 302, and the second electrode layer 303 are formed. By processing the conductive film 340 and the insulating film 333 in the same step, only one mask is necessary for processing the conductive film 340 and processing the insulating film 333; thus, the number of necessary masks can be reduced.

The insulating film 333a, the insulating film 333b, the insulating film 333c, and the insulating film 333d absorb light reflected from the first connection electrode 311, the second connection electrode 312, the first electrode layer 302, and the second electrode layer 303. The absorption of light can suppress reflection of light by metal layers such as the first connection electrode 311, the second connection electrode 312, the first electrode layer 302, and the second electrode layer 303, preventing color mixture between adjacent pixels.

The insulating film 333a, the insulating film 333b, the insulating film 333c, and the insulating film 333d has a function of preventing disclination caused by disorder of liquid crystal alignment between pixels from being perceived or preventing diffusing light from entering a plurality of adjacent pixels.

In the case of providing the insulating film 333a, the insulating film 333b, the insulating film 333c, and the insulating film 333d, depths of depressions on top surfaces of the insulating film 333a, the insulating film 333b, the insulating film 333c, and the insulating film 333d are smaller than depths of depressions on top surfaces of the first connection electrode 311, the second connection electrode 312, the first electrode layer 302, and the second electrode layer 303. As a result, disorder of liquid crystal alignment of the liquid crystal layer 328 formed later can be reduced; accordingly, the alignment state of the liquid crystal layer 328 can be controlled.

In a traditional structure, a scan line and a signal line, which respectively correspond to the first wiring and the second wiring, intersect with each other with only an insulating film 320 interposed therebetween. Since the insulating film 320 functions as a gate insulating film, there is a limitation on its thickness. In contrast, in the aforementioned structure, the second wiring is separated from the second wirings in other pixels, and the separated second wirings are connected with the first connection electrode positioned over the insulating film 323, which allows the scan line and the signal line to intersect with each other with the insulating films 320 to 323 interposed therebetween. Therefore, since the thickness of an insulating layer which insulates the scan line from the signal line can be increased in the intersection portion, parasitic capacitance generated in the intersection portion can be reduced, which contributes to the suppression of a decrease in driving speed in the liquid crystal display device even when the number of pixels is increased. By using a low-resistance metal as a material of the first connection electrode and making the thickness of the first connection electrode large, wiring resistance can be reduced; accordingly, a decrease in driving speed of the liquid crystal display device can be suppressed. Accordingly, a high-quality moving image can be provided. By making thicknesses of the first electrode layer functioning as a pixel electrode and the second electrode layer functioning as a common electrode large, surface areas of the first electrode layer and the second electrode layer can be expanded in the film thickness direction of the liquid crystal layer (three-dimensionally). This enables an electric field to be generated in a large region of the liquid crystal layer at the time of voltage application between the first electrode layer and the second electrode layer and also enables liquid crystal molecules to be controlled with the use of the electric field. Accordingly, in a liquid crystal display device with horizontal electric field mode, particularly in a liquid crystal display device in which a liquid crystal exhibiting a blue phase is used, the contrast ratio can be increased by increasing white transmittance. Further, since the first electrode layer functioning as a pixel electrode, the second electrode layer functioning as a common electrode, and the first connection electrode can be formed in the same layer at the same time, the process can be simplified. Since the insulating films having a light-shielding property can absorb light reflected from the metal layers such as the first electrode layer and the second electrode layer and suppress reflection of light by the metal layers, color mixture between adjacent pixels can be prevented.

The structure and the like in this embodiment can be combined with any of the structures and the like in the other embodiments as appropriate.

Embodiment 5

A liquid crystal display device disclosed in this specification can be applied to a variety of electronic devices (including game machines). Examples of electronic devices are a television set (also referred to as a television or a television receiver), a monitor of a computer or the like, a camera such as a digital camera or a digital video camera, a digital photo frame, an e-book reader, a mobile phone (also referred to as a cellular phone or a mobile phone device), a portable game machine, a personal digital assistant, an audio reproducing device, and a large-sized game machine such as a pachinko machine.

Figure 15A:
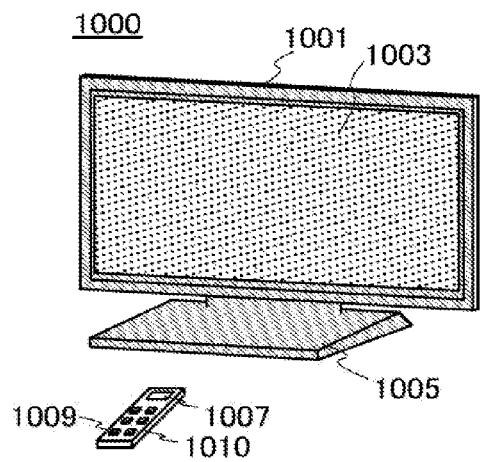
FIGS. 15A to 15F illustrate electronic devices each including a liquid crystal display device according to an embodiment of the present invention.

FIG. 15A illustrates an example of a television set. In a television set 1000, a display portion 1003 is incorporated in a housing 1001. The display portion 1003 can display images. Here, the housing 1001 is supported by a stand 1005.

The television set 1000 can be operated by an operation switch of the housing 1001 or a separate remote controller 1010. Channels and volume can be controlled with an operation key 1009 of the remote controller 1010 so that an image displayed on the display portion 1003 can be controlled. Furthermore, the remote controller 1010 may be provided with a display portion 1007 for displaying data output from the remote controller 1010.

The display portion 1003 and the display portion 1007 are manufactured using any of the liquid crystal display devices described in the above embodiments, whereby the television set 1000 with a high contrast ratio in which white transmittance is high and a decrease in driving speed can be suppressed even when the number of pixels is increased can be provided.

Note that the television set 1000 is provided with a receiver, a modem, and the like. With the receiver, a general television broadcast can be received. Moreover, when the television set is connected to a communication network with or without wires via the modem, one-way (from a sender to a receiver) or two-way (between a sender and a receiver or between receivers) data communication can be performed.

Figure 15B:
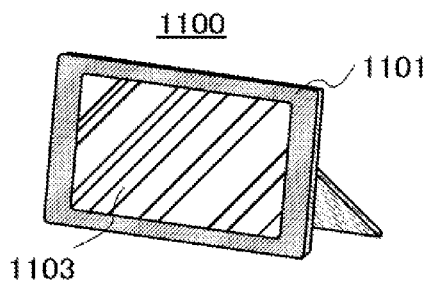

FIG. 15B illustrates an example of a digital photo frame. For example, a display portion 1103 is incorporated in a housing 1101 of the digital photo frame 1100. The display portion 1103 can display a variety of images. For example, the display portion 1103 can display data of an image taken with a digital camera or the like and function as a normal photo frame.

Note that the digital photo frame 1100 is provided with an operation portion, an external connection terminal (such as a USB terminal or a terminal that can be connected to various cables such as a USB cable), a recording medium insertion portion, and the like. Although these components may be provided on the surface on which the display portion is provided, it is preferable to provide them on the side surface or the back surface for the design of the digital photo frame 1100. For example, a memory that stores data of an image taken with a digital camera is inserted in the recording medium insertion portion of the digital photo frame, and the image data can be transferred and displayed on the display portion 1103.

The display portion 1103 is manufactured using any of the liquid crystal display devices described in the above embodiments, whereby the digital photo frame 1100 with a high contrast ratio in which white transmittance is high can be provided.

The digital photo frame 1100 may have a configuration capable of wirelessly transmitting and receiving data. A structure may be employed in which desired image data is transferred wirelessly to be displayed.

Figure 15C:
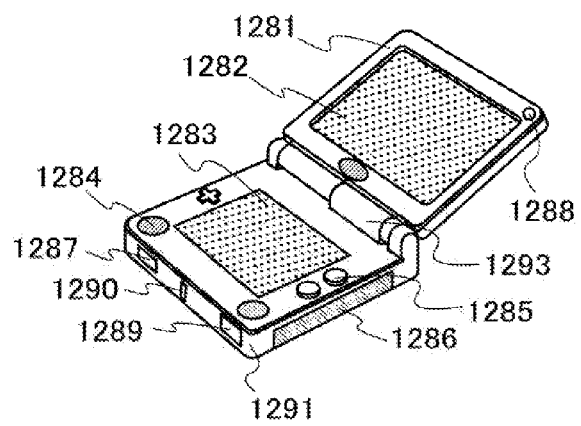

FIG. 15C illustrates a portable game machine including two housings, a housing 1281 and a housing 1291 which are jointed with a connector 1293 so that the portable game machine can be opened and folded. A display portion 1282 is incorporated in the housing 1281, and a display portion 1283 is incorporated in the housing 1291. In addition, the portable game machine illustrated in FIG. 15C includes a speaker portion 1284, a recording medium insertion portion 1286, an LED lamp 1290, an input means (an operation key 1285, a connection terminal 1287, a sensor 1288 (having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), or a microphone 1289), and the like. Needless to say, the structure of the portable game machine is not limited to the above, and may be any structure which is provided with at least a liquid crystal display device disclosed in this specification. Moreover, another accessory may be provided as appropriate. The portable game machine illustrated in FIG. 15C has a function of reading a program or data stored in a recording medium to display it on the display portion, and a function of sharing information with another portable game machine by wireless communication. The portable game machine illustrated in FIG. 15C can have a variety of functions without limitation to the above.

The display portion 1282 and the display portion 1283 are manufactured using any of the liquid crystal display devices described in the above embodiments, whereby a portable game machine with a high contrast ratio in which white transmittance is high can be provided.

Figure 15D:
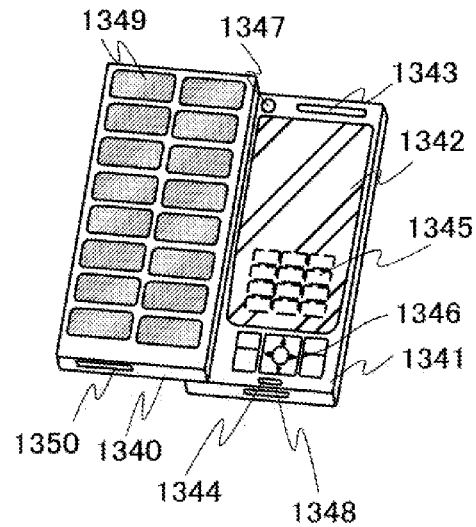

FIG. 15D illustrates a mobile phone including two housings, a housing 1340 and a housing 1341. Moreover, the housing 1340 and the housing 1341 which are developed as illustrated in FIG. 15D can slide to overlap with each other. Thus, the mobile phone can be in a suitable size for portable use. Further, the housing 1341 includes a display panel 1342, a speaker 1343, a microphone 1344, a pointing device 1346, a camera lens 1347, an external connection terminal 1348, and the like. The housing 1340 includes a solar cell 1349 for charging the mobile phone, an external memory slot 1350, and the like. An antenna is incorporated in the housing 1341. In FIG. 15D, display buttons 1345 are displayed on the display portion 1342. A user can input data by touching the display buttons 1345 with a finger or the like.

The display panel 1342 is manufactured using any of the liquid crystal display devices described in the above embodiments, whereby a mobile phone with a high contrast ratio in which white transmittance is high can be provided.

Figure 15E:
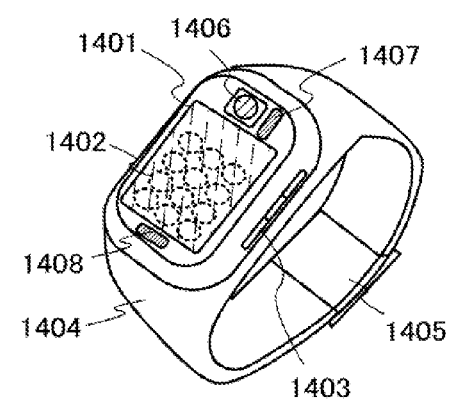

FIG. 15E is a perspective view of an example of a mobile phone that the user can wear on the wrist like a wristwatch.

This mobile phone is formed with a main body which includes a communication device having at least a telephone function, and a battery; a band portion 1404 which enables the main body to be worn on the wrist; an adjusting portion 1405 for adjusting the band portion 1404 to fit the wrist; a display portion 1401; a speaker 1407; and a microphone 1408.

In addition, the main body includes operation switches 1403. The operation switches 1403 can serve, for example, as a switch for starting a program for the Internet when pushed, in addition to serving as a power switch, a switch for switching displays, a switch for instruction to start taking images, or the like, and can be configured to have respective functions.

A user can input data to this mobile phone by touching the display portion 1401 with a finger or an input pen, operating the operation switches 1403, or inputting voice to the microphone 1408. In FIG. 15E, display buttons 1402 are displayed on the display portion 1401. A user can input data by touching the display buttons 1402 with a finger or the like.

Further, the main body includes a camera portion 1406 including an image pick-up means having a function of converting an image of an object, which is formed through a camera lens, into an electronic image signal. Note that the camera portion is not necessarily provided.

The mobile phone illustrated in FIG. 15E may be provided with a receiver of a television broadcast or the like, and can display an image on the display portion 1401 by receiving the television broadcast. In addition, the mobile phone is provided with a memory device such as a memory, or the like, and can record the television broadcast in the memory. The mobile phone illustrated in FIG. 15E may have a function of collecting location information such as GPS.

The display portion 1401 is manufactured using any of the liquid crystal display devices described in the above embodiments, whereby a mobile phone with a high contrast ratio in which white transmittance is high can be provided.

Figure 15F:
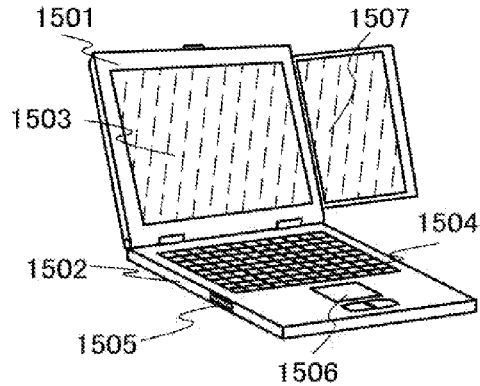

FIG. 15F is a perspective view illustrating an example of a portable computer.

In the portable computer illustrated in FIG. 15F, a top housing 1501 having a display portion 1503 and a bottom housing 1502 having a keyboard 1504 can overlap with each other by closing a hinge unit which connects the top housing 1501 and the bottom housing 1502. Thus, the portable computer is conveniently carried. Moreover, in the case of using the keyboard for input of data, the hinge unit is opened so that a user can input data looking at the display portion 1503.

The bottom housing 1502 includes a pointing device 1506 with which input can be performed, in addition to the keyboard 1504. If the display portion 1503 is a touch input panel, the user can input data by touching part of the display portion 1503. The bottom housing 1502 includes an arithmetic function portion such as a CPU or hard disk. In addition, the bottom housing 1502 includes an external connection port 1505 into which another device such as a communication cable conformable to communication standards of a USB is inserted.

The top housing 1501 further includes a display portion 1507 which can be stored in the top housing 1501 by being slid therein. Thus, a large display screen can be realized. In addition, the user can adjust the orientation of a screen of the storable display portion 1507. When the storable display portion 1507 is a touch input panel, the user can input data by touching part of the storable display portion.

The display portion 1503 and the storable display portion 1507 are manufactured using any of the liquid crystal display devices described in the above embodiments, whereby a portable computer with a high contrast ratio in which white transmittance is high can be provided.

In addition, the portable computer illustrated in FIG. 15F can be provided with a receiver or the like and can receive a television broadcast to display an image on the display portion. The user can watch a television broadcast when the whole screen of the storable display portion 1507 is exposed by sliding the storable display portion 1507 and the angle of the screen is adjusted while the hinge unit which connects the top housing 1501 and the bottom housing 1502 is kept closed. In this case, the hinge unit is not opened and display is not performed on the display portion 1503. In addition, start up of only a circuit for displaying the television broadcast is performed. Therefore, power can be consumed to the minimum, which is advantageous to the portable computer whose battery capacity is limited.

The structure and the like in this embodiment can be combined with any of the structures and the like in the other embodiments as appropriate.

This application is based on Japanese Patent Application serial no. 2011-054032 filed with Japan Patent Office on Mar. 11, 2011, the entire contents of which are hereby incorporated by reference.

What is claimed is:

1. A liquid crystal display device comprising:
a first pixel and a second pixel which is adjacent to the first pixel, each of the first pixel and the second pixel comprising:
a first wiring;
a first insulating film over the first wiring;
a second wiring over the first insulating film, the second wiring being perpendicular to the first wiring;
a transistor comprising a gate electrode, a gate insulating film, a semiconductor layer, a source electrode, and a drain electrode;
a second insulating film over the first insulating film and the transistor;
a third insulating film over the second insulating film; and
a substrate over the third insulating film,
wherein the second wiring in the first pixel is spaced from the second wiring in the second pixel,
wherein the second wiring in the first pixel and the second wiring in the second pixel are electrically connected to each other with a connection electrode which is located over the second insulating film,
wherein the first insulating film and the gate insulating film exist in the same layer,
wherein the third insulating film is located over the connection electrode,
wherein the third insulating film is configured to adjust a cell gap of the liquid crystal display device, and
wherein the third insulating film is in contact with the connection electrode and the substrate.

2. The liquid crystal display device according to claim 1, wherein the first insulating film has a step caused by the first wiring, and
wherein the second insulating film is configured to absorb the step to give a planar surface.

3. The liquid crystal display device according to claim 1, wherein the connection electrode is electrically connected to the source electrode of the transistor.

4. The liquid crystal display device according to claim 1, wherein the first wiring and the gate electrode exist in the same layer.

5. The liquid crystal display device according to claim 1, wherein the second insulating film is in contact with the connection electrode.

6. The liquid crystal display device according to claim 1, wherein the second insulating film has a thickness more than or equal to 500 nm and less than or equal to 5 µm.

7. The liquid crystal display device according to claim 1, further comprising:
a pixel electrode electrically connected to the drain electrode of the transistor; and
a common electrode positioned between parts of the pixel electrode,
wherein the pixel electrode and the common electrode exist in the same layer as the connection electrode.

8. An electronic device comprising the liquid crystal display device according to claim 1.

9. The liquid crystal display device according to claim 1, wherein the third insulating film is in contact with the connection electrode.

10. A liquid crystal display device comprising:
a first pixel and a second pixel which is adjacent to the first pixel, each of the first pixel and the second pixel comprising:

a first wiring;
a first insulating film over the first wiring;
a second wiring over the first insulating film, the second wiring being perpendicular to the first wiring and spaced from the second wiring in the other of the first pixel and the second pixel;
a transistor comprising a gate electrode, a gate insulating film, a semiconductor layer, a source electrode, and a drain electrode;
a second insulating film over the first insulating film and the transistor;
a connection electrode over the second insulating film, the connection electrode electrically connecting the second wiring in the first pixel to the second wiring in the second pixel;
a third insulating film over and in contact with the connection electrode; and
a substrate over and in contact with the third insulating film,
wherein the first insulating film and the gate insulating film exist in the same layer, and
wherein the connection electrode is a metal film.

11. The liquid crystal display device according to claim 10, wherein the metal film comprises a metal selected from aluminum copper, titanium, chromium, tantalum, molybdenum, and tungsten.

12. The liquid crystal display device according to claim 10, wherein the connection electrode is electrically connected to the source electrode of the transistor.

13. The liquid crystal display device according to claim 10, wherein the first wiring and the gate electrode exist in the same layer.

14. The liquid crystal display device according to claim 10, wherein the second insulating film is in contact with the connection electrode.

15. The liquid crystal display device according to claim 10, wherein the second insulating film has a thickness more than or equal to 500 nm and less than or equal to 5 μm.

16. The liquid crystal display device according to claim 10, further comprising:
a pixel electrode electrically connected to the drain electrode of the transistor; and
a common electrode positioned between parts of the pixel electrode,
wherein the pixel electrode and the common electrode exist in the same layer as the connection electrode.

17. The liquid crystal display device according to claim 16, further comprising a liquid crystal layer over the pixel electrode and the common electrode,
wherein a thickness of the pixel electrode and a thickness of the common electrode are each more than or equal to 20% and less than or equal to 80% of a thickness of the liquid crystal layer.

18. The liquid crystal display device according to claim 10, wherein the third insulating film is able to block light.

19. An electronic device comprising the liquid crystal display device according to claim 10.

* * * * *